United States Patent
Pappalardo et al.

[11] Patent Number: 5,875,438
[45] Date of Patent: Feb. 23, 1999

[54] METHOD FOR STORING MEMBERSHIP FUNCTIONS AND RELATED CIRCUIT FOR CALCULATING A GRADE OF MEMBERSHIP OF ANTECEDENTS OF FUZZY RULES

[75] Inventors: Francesco Pappalardo, Paterno'; Vincenzo Matranga, Palermo; Davide Tesi, Campi Bisanzio; Dario Di Bella, Nicolosi, all of Italy

[73] Assignee: Consorzio per la Ricerca sulla Microelettronica nel Mezzogiorno, Catania, Italy

[21] Appl. No.: 624,736

[22] Filed: Mar. 26, 1996

[30] Foreign Application Priority Data

Mar. 28, 1995 [EP] European Pat. Off. ............ 96830113

[51] Int. Cl.$^6$ ............................................. G06G 7/00
[52] U.S. Cl. ................ 706/3; 706/1; 706/5; 706/7; 706/8; 706/52; 706/900
[58] Field of Search ................ 364/764; 395/3; 706/3, 5, 1, 4, 7, 8, 52, 900

[56] References Cited

U.S. PATENT DOCUMENTS

| | | | |
|---|---|---|---|
| 5,179,629 | 1/1993 | Nakamura | 706/6 |
| 5,305,251 | 4/1994 | Shigeoka et al. | 364/807 |
| 5,343,553 | 8/1994 | Miyazawa et al. | 706/4 |
| 5,598,512 | 1/1997 | Niwa | 706/52 |
| 5,615,303 | 3/1997 | Abruzzese | 706/4 |

OTHER PUBLICATIONS

Partial European Search Report from European Patent Application 95830113.7, filed Mar. 28, 1995.
Proceedings of the 2nd International Conference on Fuzzy Systems, Mar. 28 –Apr. 1, 1993, San Francisco, CA, USA, vol. 1, 1993 IEEE, New York, USA, pp. 612–617, M. Lee, et al., "Integrating Design Stages of Fuzzy Systems Using Genetic Algorithms".
IEICE Transactions on Electronics, vol. E76–c, No. 7, Jul. 1993, Tokyo, JP, pp. 1102–1111, K. Nakamura "A 12–Bit Resolution 200 kFLIPS Fuzzy Inference Processor".

*Primary Examiner*—Tariq R. Hafiz
*Assistant Examiner*—Jason W. Rhodes
*Attorney, Agent, or Firm*—Wolf, Greenfield & Sacks, P.C.

[57] ABSTRACT

A method for storing a membership function, include storing a position of a vertex of a triangle that defines the membership function in a universe of discourse and storing a first distance between the position of the vertex a point of intersection between a left side of the triangle and an axis of the universe of discourse. Further, the method includes storing a second distance between the position of the vertex and point of intersection between right side of the triangle and the axis of the universe of discourse. The present invention furthermore relates to a circuit for calculating a grade of membership of an antecedent of a fuzzy rule, and is adapted to fuzzify an input variable by adopting the geometric proportions that occur between homologous sides of similar triangles defined by the position of the input value in the universe of discourse.

20 Claims, 14 Drawing Sheets

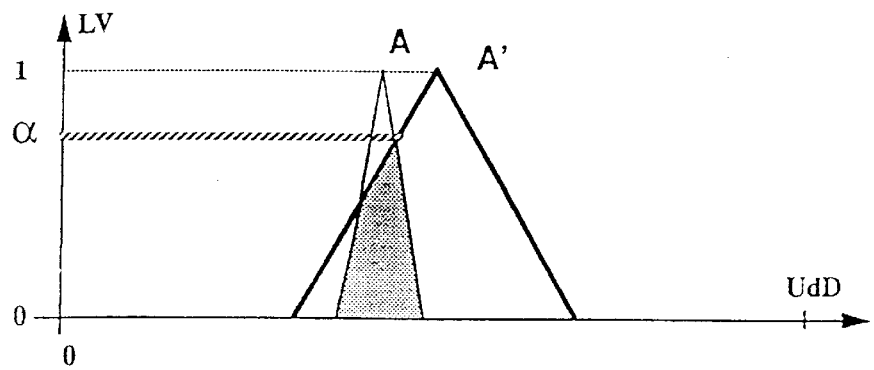
Fig. 1
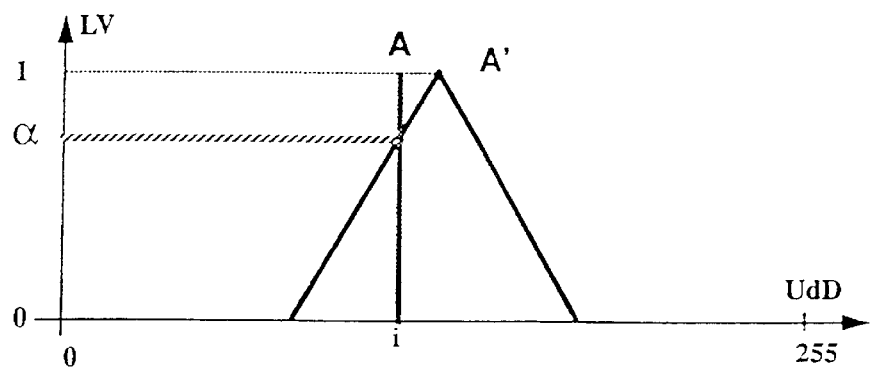
Fig. 2
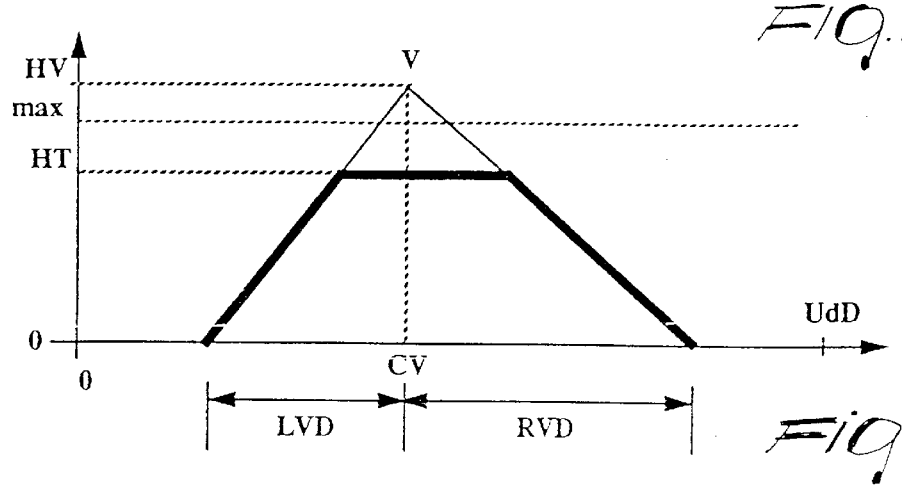
Fig. 30
Fig. 3

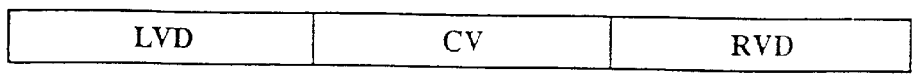
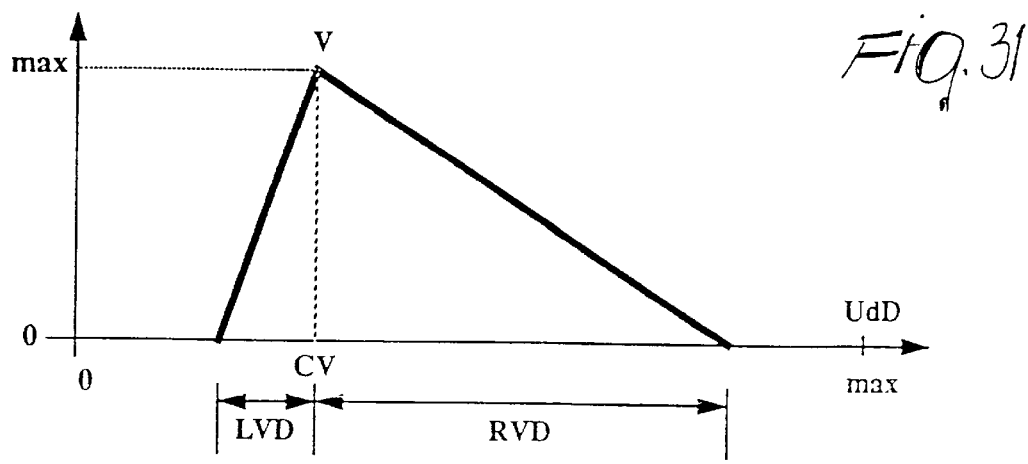
Fig. 31
Fig. 18
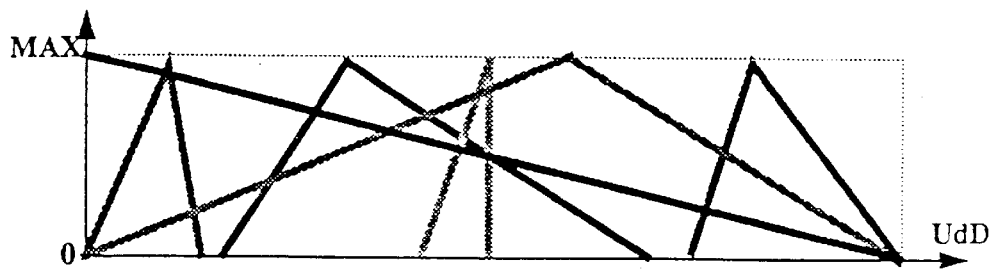
Fig. 19
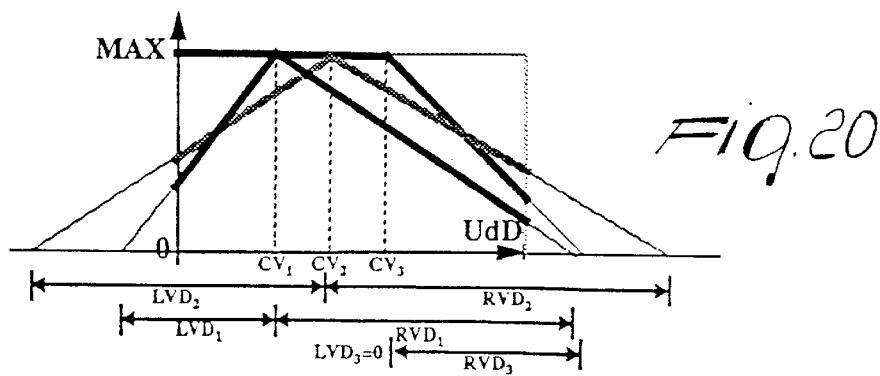
Fig. 20

METHOD FOR STORING MEMBERSHIP FUNCTIONS AND RELATED CIRCUIT FOR CALCULATING A GRADE OF MEMBERSHIP OF ANTECEDENTS OF FUZZY RULES

BACKGROUND OF THE INVENTION

1. Field of the Invention

The present invention relates to a method for storing membership functions and to a related circuit for calculating a grade of membership of antecedents of fuzzy rules.

2. Discussion of the Related Art

A fuzzy rule is constituted by an antecedent part and by a consequent part or conclusion. The antecedent part has a grade of membership of its own, determined on the basis of a value assumed by inputs and follows semantics of the rule itself.

The antecedent part can be composed of a plurality of terms. In order to determine a weight of an individual term, according to a meaning assumed in fuzzy logic, it is necessary to determine the highest value of an intersection between a membership function and a generic input.

In general, the grade of membership $\alpha$ is defined as follows:

$$\alpha = \max_x \{\min [A, A']\}$$

where A and A' respectively designate the input sets and the corresponding membership function, as shown in FIG. 1.

In the case of crisp inputs, with reference to FIG. 2, the value $\alpha$ is determined by a segment produced by an intersection between the straight line A defined by the equation UdD=I (where I is the input of the system and UdD is the universe of discourse) and the membership function A'.

Performing this calculation entails using a method for storing the membership function, which has a triangular shape in the example of FIG. 1, so that it is possible to circuitally perform the intersection with the input in the simplest and most economical manner in terms of hardware.

There are various methods for storing membership functions and for their fuzzification. One of these methods consists in storing all the points of the membership function by means of a look-up table.

Another method is the storing of triangular membership functions by means of the gradients and the central vertex of the triangle.

Another method is the storing of trapezoidal membership functions by means of the two vertices and of the distance, relative to the nearest vertex, of the points of intersection between the two sides of the triangle and the axis representing the universe of discourse (UdD), as described in the article "A Parameterized Fuzzy Processor and Its Applications", by B. T. Chen et al., published in the journal "Fuzzy Sets and Systems", Elsevier Science Publishers B.V., no. 59, 1993, pages 149–172.

SUMMARY OF THE INVENTION

An aim of the present invention is to provide a method for storing membership functions and the related circuit for calculating the grade of membership of the antecedent part of the fuzzy rules that determines the intersection between the membership function and the input in a simple and economical manner.

An object of the present invention is to provide a method of storing information which describes a membership function where a number of bits used is not excessive.

Another object of the present invention is to provide a method that is advantageous, in terms of time and computing simplicity, for calculating the grade of membership $\alpha$ of the antecedent part of a fuzzy rule.

A further object of the present invention is to provide a circuit for calculating the grade of membership $\alpha$ that is simpler than known circuits and which can, therefore, be implemented with a smaller silicon area.

Another object of the present invention is to provide a method and a circuit that are each highly reliable, relatively easy to manufacture, and competitive in costs.

This aim, these objects, and others which will become apparent hereinafter are achieved by a method for storing membership functions, characterized in that it comprises the following steps: storing a position of a vertex of a triangle that defines the membership function in the universe of discourse; storing a first distance between said position of the vertex in the universe of discourse and the point of intersection between a left side of the triangle that defines the membership function and an of the universe of discourse; storing a second distance between said position of the vertex in the universe of discourse and a point of intersection between a right side of the triangle that defines the membership function and the axis of the universe of discourse.

Further, an apparatus for calculating a grade of membership of an antecedent part of a fuzzy rule comprises a means for receiving an input value and a means for fuzzifying the input value by adopting geometric proportions that occur between homologous sides of similar triangles which define a membership function defined by position of the input value in a universe of discourse.

This aim, these objects, and others which will become apparent hereinafter are furthermore achieved with a circuit for calculating the grade of membership of the antecedent of a fuzzy rule, characterized in that it comprises means adapted to fuzzify an input variable by adopting the geometric proportions that occur between homologous sides of similar triangles defined by the position of the input value in the universe of discourse.

BRIEF DESCRIPTION OF THE DRAWINGS

The characteristics and advantages of the present invention will become apparent from the description of a preferred, non-limiting embodiment thereof, illustrated by way of example with reference to the accompanying drawings, wherein:

FIG. 1 is an example of an intersection between a generic input and a membership function;

FIG. 2 is an example of an intersection between a crisp input and a membership function;

FIG. 3 is a parametric representation of a membership function of the trapezoidal type;

FIG. 18 is a parametric representation of a triangular membership function;

FIG. 19 shows examples of triangular membership functions in which the vertex is at the peak of the degree of truth;

FIG. 20 shows examples of membership functions of the pentagonal type framed at the borders of the universe of discourse, with the restriction of the distance LVD and RVD;

FIG. 30 is a diagram of a memory word used to represent a membership function; and FIG. 31 is a diagram of a memory word used to represent a membership function.

DETAILED DESCRIPTION

Figure 4:
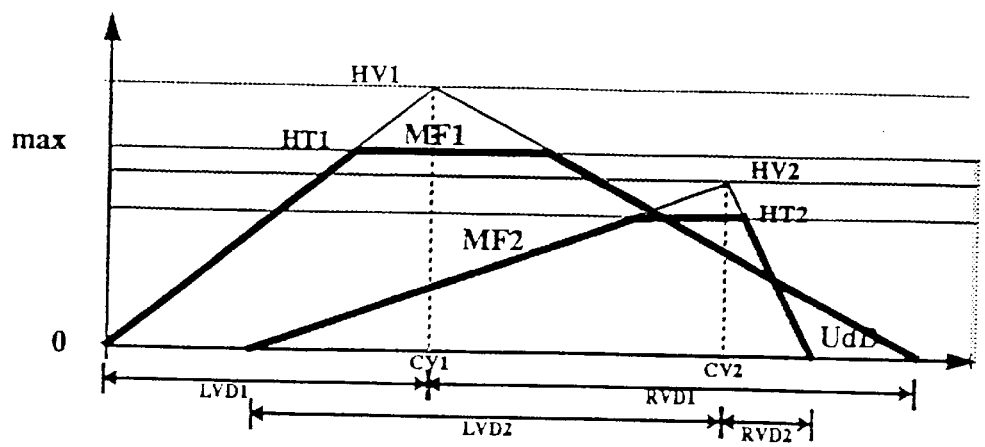
FIG. 4 is a parametric representation of possible membership functions of the trapezoidal type.

In order to describe membership functions (MF), it is necessary to store some parameters of the membership function. These parameters must be chosen carefully in order to have the lowest possible cost in terms of bits. Usually, the larger the number of bits introduced, the higher the number of membership functions that can be represented.

In a first case, consider the storing of membership functions represented by triangles and trapezoids.

The storing method for trapezoids according to the present invention is based on the observation that a trapezoid can be considered as a truncated triangle.

With reference to FIG. 3, the characteristic parameters that allow one to unambiguously identify membership functions represented by trapezoids are: a position of a vertex CV in the universe of discourse UdD, distances related to the vertex CV, that is to say, distances LVD and RVD, an altitude of the triangle HV, an altitude of the trapezoid HT, and a maximum value of a degree of truth max.

As shown in FIG. 30, a memory word can store these characteristic parameters. There are five parameters and they are defined as follows.

The vertex position CV, in the universe of discourse UdD, is the vertex of the triangle that defines the trapezoidal membership function.

A leftward distance LVD between the vertex CV and a point of intersection between the membership function and an axis of the universe of discourse, along said axis.

A rightward distance RVD between the vertex CV and the point of intersection between the membership function and the axis of the universe of discourse UdD, along said axis.

An altitude HV of the triangle that is used to describe the membership function and an altitude HT of the membership function.

The maximum value of the degree of truth max, that is to say the maximum value that the membership function can assume, is a known value for all membership functions.

The value HT is always less than, or equal to, the value of max.

The dimensions of the above mentioned parameters are a function of the number of membership functions to be described. Accordingly, the present description neither limits nor specifies the optimum dimensions in terms of bits used. However, in order to have a large number of membership functions, it is recommended that CV have a number of bits equal to the number of bits that discretizes the UdD, that LVD and RVD have a greater or equal number, and that HV have a number of bits greater than, and HT have a number of bits equal to, the number of bits that discretize the degree of truth, that is to say, the value max.

The above recommended conditions are assumed to be met hereinafter and will not be further discussed below.

In order to describe degenerate membership functions without increasing the number of bits of the above mentioned parameters, the following conditions are set:

a) if LVD or RVD is equal to zero, the plot of the membership function is horizontal in the corresponding left or right side;

b) if LVD and RVD are both equal to zero, the plot of the membership function is horizontal throughout the UdD, with the degree of truth equal to the value indicated by the bits that indicate the altitude HT of the membership function;

c) if there is a perfectly vertical left or right side, which should be described with LVD or RVD=0, it is instead described as a side with minimal gradient, that is to say, with LVD or RVD=1, since the same result is yielded for calculating the grade of membership α.

When HT and HV vary, it is possible to describe trapezoidal membership functions, triangular membership functions, and pentagonal or hexagonal membership functions at the borders of the universe of discourse (UdD).

All the membership functions that can be represented are listed hereafter:

(I) Trapezoidal membership functions, as shown in FIG. 4, in which the shorter parallel side is at the value HT, which can be equal to the value max (function MF1) or lower than said value (function MF2).

Figure 5:
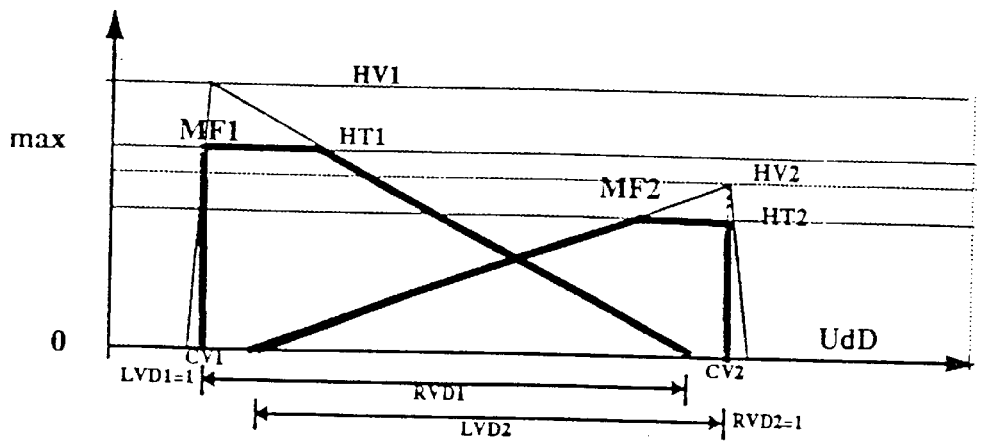
FIG. 5 is a parametric representation of possible membership functions of the right-angled trapezoidal type.

(ii) Membership functions of the right-angled trapezoid type, as shown in FIG. 5, in which the shorter parallel side is equal to, or less than, the maximum value max of the degree of truth. It should be noted, that for calculating the grade of membership α, the perfectly vertical membership function behaves like the membership function that has the minimal slope, that is to say, with LVD=RVD=1. Therefore, the membership function MF1, shown in FIG. 5, with a perfectly vertical left side, is defined with LVD=1, that is to say, with the minimal slope. Whereas, the function MF2, which has a perfectly vertical right side, is defined with RVD=1, since, as mentioned above, they have an identical behavior in the calculation of the grade of membership α.

Figure 6:
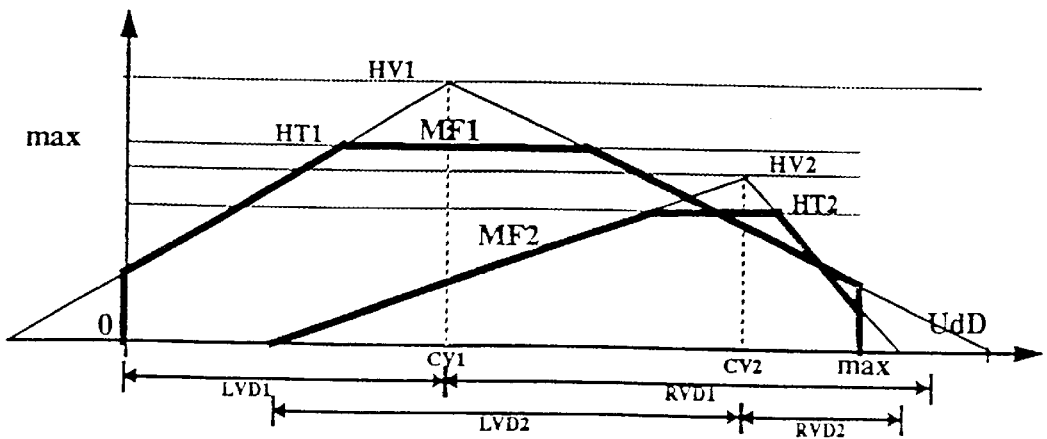
FIG. 6 is a parametric representation of possible membership functions of the hexagonal or pentagonal type, framed at the borders of the universe of discourse.

(iii) Membership functions of the hexagonal or pentagonal type, as shown in FIG. 6, framed at the borders of the UdD, in which the altitude HT is smaller than the value max of the degree of truth (MF2) or is equal to said value (MF1).

Figure 7:
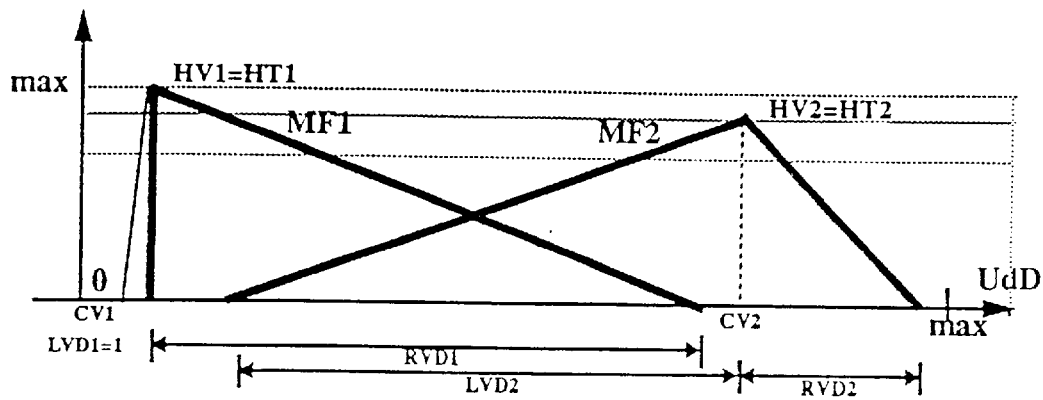
FIG. 7 is a parametric representation of possible membership functions of the triangular type.

(iv) Membership functions of the triangular type, as shown in FIG. 7, in which the value of the vertex is less than the maximum value max of the degree of truth (MF2) or is equal to said value (MF1).

Figure 8:
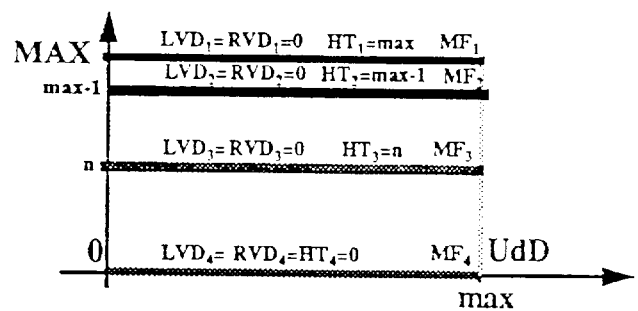
FIG. 8 is a parametric representation of possible membership functions of the horizontal type.

(v) Horizontal membership functions, as shown in FIG. 8. In this case, the value HT indicates the grade of membership α.

Figure 9:
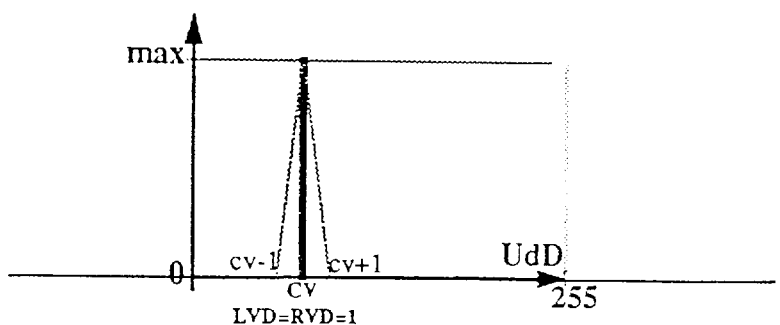
FIG. 9 is a parametric representation of possible membership functions of the crisp type.

(vi) Crisp membership functions, such as the one shown in FIG. 9, which is always zero except in CV, where it assumes the value of the maximum degree of truth max. These membership functions are not represented with LVD=RVD=0, as would seem to be more logical, but with LVD=RVD=1, which behaves, in terms of the calculation of the value of α, like the crisp function and is used as such, whereas the coding LVD=0 or RVD=0 is given the meaning of a horizontal side.

The calculation of the grade of membership α, in other words, the fuzzification of the input value, is achieved by adopting the geometric proportions that occur among homologous sides of similar triangles.

Figure 10:
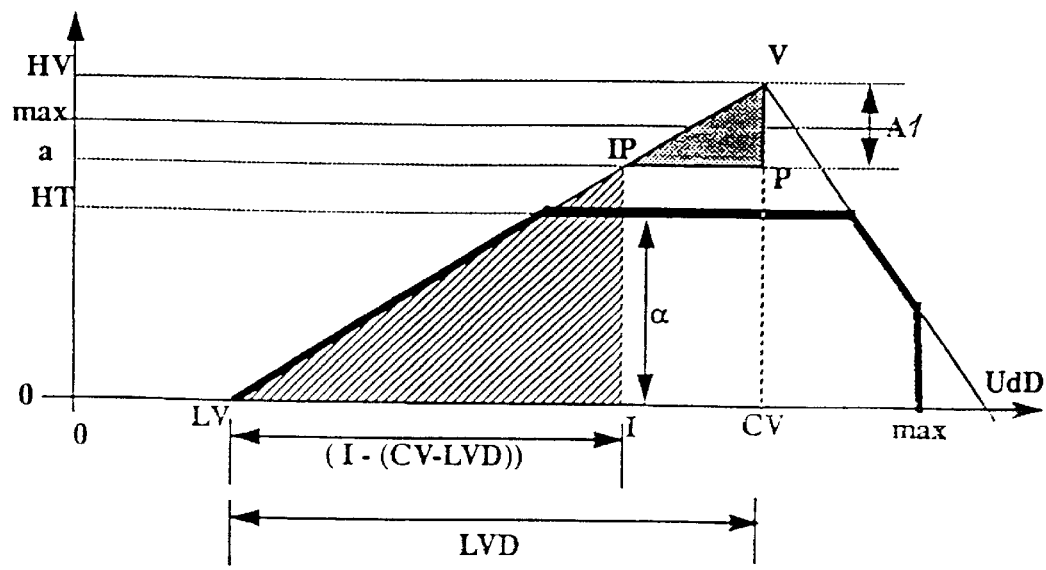
FIG. 10 is a parametric representation of a membership function used to calculate the grade of membership α by using similar triangles for the condition I≦CV.

If I is the input to be fuzzified, when I≤CV the situation shown in FIG. 10 is obtained.

With regard to similar right-angled triangles V-CV-LV and IP-I-LV, the following proportion can be written:

$$a:(I-(CV-LVD))\cdot HV:LVD$$

from which:

$$a=[HV*(I-(CV-LVD))]/LVD$$

This sets the condition:
if a>HT then α=HT else α=a.

In another manner, α can be calculated by considering the similar right-angled triangles V-P-IP and V-CV-LV. In this case, one obtains:

$$A1:HV=(CV-I):LVD$$

and from this one obtains the value of A1:

$$A1=[HV*(CV-I)]/LVD$$

Accordingly:
if A1>HV then a=0 else a=HV−A1.

This check is performed because, if the input I is less than LV, the value A1 thus obtained is greater than HV; in this case, the value of α is zero.

Furthermore,
if a>HT then α=HT else α=a.

Figure 11:
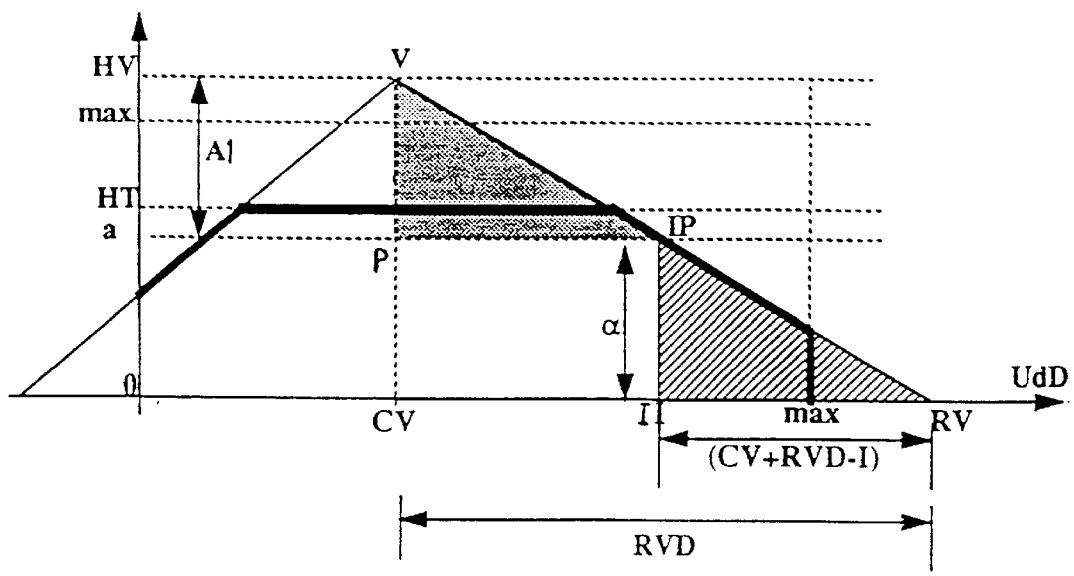
FIG. 11 is another parametric representation of a membership function used to calculate the grade of membership α by using similar triangles for the condition I>CV.

For the condition I>CV, the situation is similar to the one shown in FIG. 11. As regards the similar right-angled triangles V-CV-RV and IP-I-RV, the following proportion can be written:

$$a:(CV+RVD-I)=HV:RVD$$

from which:

$$a=[HV*(CV+RVD-I)]/RVD$$

Accordingly:
if a>HT then α=HT else α=a.

In this case, too, α can be calculated in another manner, by considering the similar right-angled triangles V-P-IP and V-CV-RV. In this case one obtains:

$$A1:HV=(I-CV):RVD$$

and from this proportion the value of A1 is obtained:

$$A1=[HV*(I-CV)]/RVD$$

Accordingly:
if A1>HV then a=0 else a=HV−A1.

This check is performed because, if the input I is greater than RV, the value A1 thus obtained is greater than HV; in this case, the value of α is zero.

Furthermore,
if a>HT then α=HT else α=a

To conclude, according to the above statements, the value of α can be calculated by means of the following formulae:

If the input I is less than, or equal to, CV:

$$a=[HV*(I-CV+LVD)]/LVD \qquad (1)$$

If a>HT then α=HT else α=a;
If the input I is greater than CV:

$$a=[HV*(CV-I+RVD)]/RVD \qquad (2)$$

If a>HT then α=HT else α=a.

These formulae entail performing two subtractions, one multiplication, and one division inside the device used for calculation. It should also be noted that once the membership function has been set, the values CV, HV, HT, LVD, and RVD are fixed, whereas the value of the input I varies.

Figure 12:
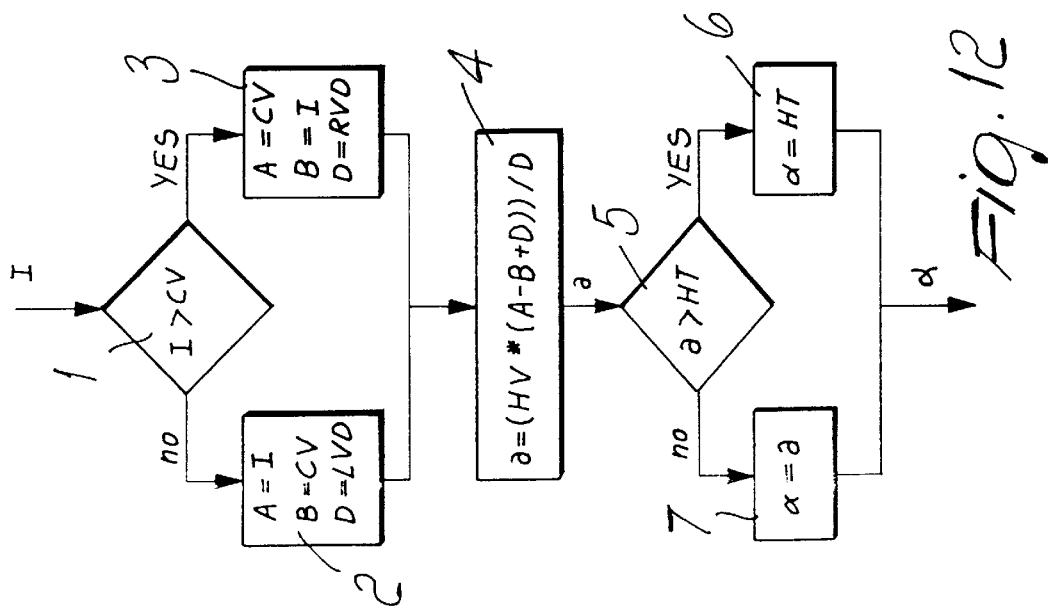
FIG. 12 is a flowchart of the algorithm of a first embodiment of the method according to the present invention, used to calculate the grade of membership α.

Owing to the similar form of equations (1) and (2), the flowchart of the calculation algorithm for the first embodiment of the method according to the present invention is similar to the one shown in FIG. 12.

Initially, the input I is provided to the block 1, which checks whether or not the given input value is greater than CV. If it is less than CV or equal thereto, the block 2 assigns the parameters of equation (1) to the parameters A, B, and D (more specifically, A=I, B=CV, and D=LVD). Otherwise, if I>CV, the parameters of equation (2) are assigned to the parameters A, B, and D by means of the block 3 (more specifically, A=CV, B=I, and D=RVD).

The block 4 uses the parameters A, B, and D of the blocks 2 and 3 to introduce them into the generic formula of equations (1) and (2), that is to say, the formula a=(HV * (A−B+D))/D.

The result a, which is the value of the degree of truth that corresponds to the input value I determined on the basis of the triangle defining the membership function (see FIGS. 10 and 11), is sent to the block 5, which tests whether this value of a is greater than the value of HT. If it is, the grade of membership $\alpha$ is set, by means of the block 6, to the value of HT; if a is equal to, or less than, HT, the block 7 assigns the value of a to $\alpha$.

Figure 13:
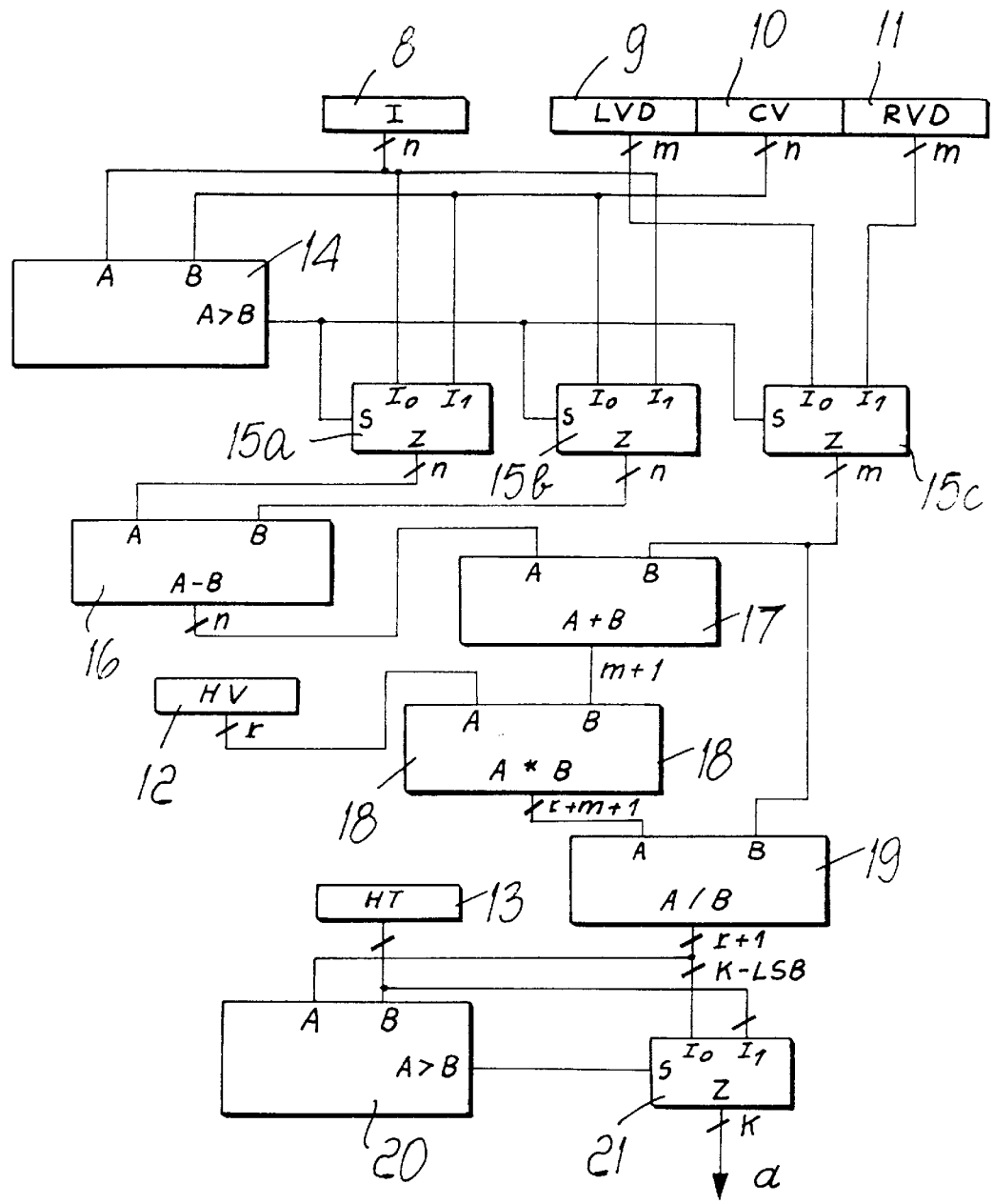
FIG. 13 is a circuit block diagram of a first embodiment of the circuit according to the present invention, related to the first embodiment of the method shown in FIG. 12.

The block diagram of the circuit that calculates the value of $\alpha$ according to the first embodiment of the method according to the present invention is shown in FIG. 13.

The circuit includes a first input register 8 in which the current value of the input variable I is stored. There are also five other registers 9–13 for storing, respectively, the values of LVD, CV, RVD, HV, and HT. These are the values related to the membership function at issue, and remain unchanged as the input variable I assumes constantly changing values.

The register 8 of the input variable I and the register 10 of the value CV are connected to a modulus comparator 14, which tests the condition I>CV of the block 1 of FIG. 12. On the basis of the result provided by the comparator 14, the multiplexers 15*a–c* assign the values of I, CV, and LVD or of CV, I, and RVD to the parameters A, B, and D, respectively. More specifically, the multiplexers perform the function of the blocks 2 and 3 of FIG. 12. The outputs of the multiplexers 15*a* and 15*b* that provide, respectively, the values of the parameters A and B are sent to a subtracter 16 to produce the function A−B. The output of the subtracter 16 and the output of the multiplexer 15*c* that provides the parameter D are sent to an adder 17 that supplies the result of the operation A−B+D. The output of the adder 17 and the contents of the register 12 of the value HV are sent to a multiplier 18, which produces the result of the function HV * (A−B+D). The output of the multiplier 18 and the value D provided by the multiplexer 15*c* are sent to a divider 19, which provides the parameter a=(HV * (A−B+D))/D. The output of the divider 19 is sent, together with the value of HT contained in the register 13, to a second modulus comparator, which tests the condition a>HT. On the basis of the result thus obtained, a fourth multiplexer 21 provides the value of HT or of a as the value of the grade of membership $\alpha$.

If the second calculation method described above is used, the formulae to be used are:

If the input I is less than, or equal to, CV:

$$A1 = [HV*(CV-I)]/LVD \qquad (3)$$

if A1>HV then a=0 else a=HV−A1,
if a>HT then $\alpha$=HT else $\alpha$=a.
If the input I is greater than CV:

$$A1 = [HV*(I-CV)]/RVD \qquad (4)$$

if A1>HV then a=0 else a=HV−A1,
if a>HT then $\alpha$=HT else $\alpha$=a.

These formulae entail performing two subtractions, one multiplication, and one division inside a circuit used for calculation. As in the first embodiment of the method, the membership function is set with the values CV, HV, HT, LVD, and RVD, whereas the input value I varies.

Figure 14:
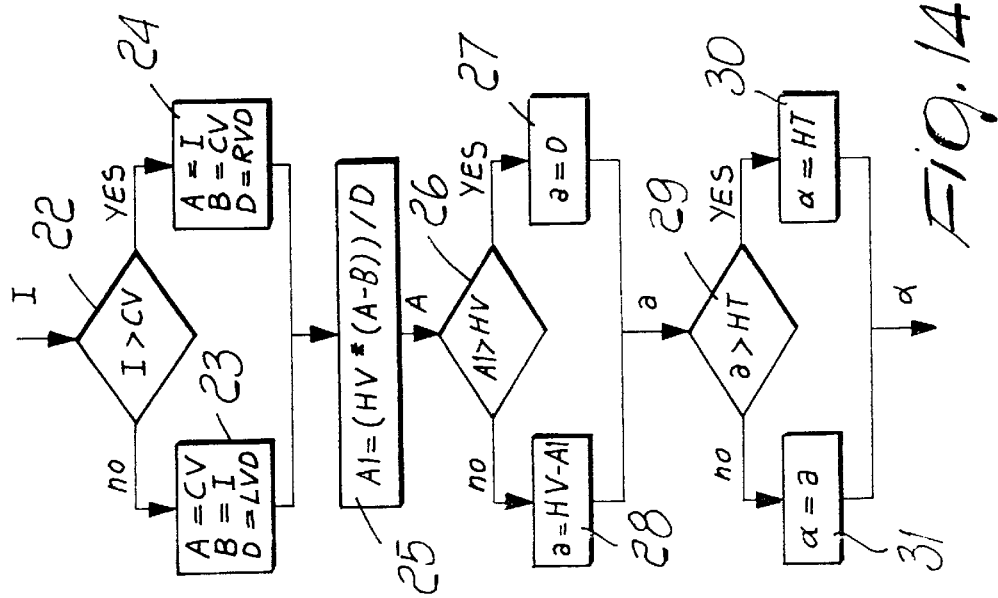
FIG. 14 is a flowchart of the algorithm of a second embodiment of the method according to the present invention, used to calculate the grade of membership α.

The flowchart of this second embodiment of the method according to the present invention is shown in FIG. 14.

Initially, the input I is supplied to the block 22, which tests whether or not the given input value is greater than CV. If it is less than, or equal to, CV, the block 23 assigns the parameters of equation (3) to the parameters A, B, and D (more specifically, A=CV, B=I, and D=LVD). Otherwise, if I>CV, the parameters of equation (4) are assigned by the block 24 to the parameters A, B, and D (more specifically, A=I, B=CV, and D=RVD).

The block 25 uses the parameters A, B, and D of the blocks 23 and 24 to introduce them into the generic formula of equations (3) and (4), that is to say, in the formula A1=(HV * (A−B))/D.

The result A1, which is equal to the value (HV−a) (see FIGS. 10 and 11), is sent to the block 26, which tests whether this value of A1 is greater than the value of HV. If it is, the value a is set to zero by means of block 27; if the value of A1 is less than, or equal to, HV, then block 28 assigns the value of (HV−A) to a.

The result a is sent to the block 29, which tests whether the value of a is greater than the value of HT. If it is, the grade of membership $\alpha$ is set, by means of the block 30, to the value of HT. If it is less than, or equal to, HT, then block 31 assigns the value of a to $\alpha$.

Figure 15:
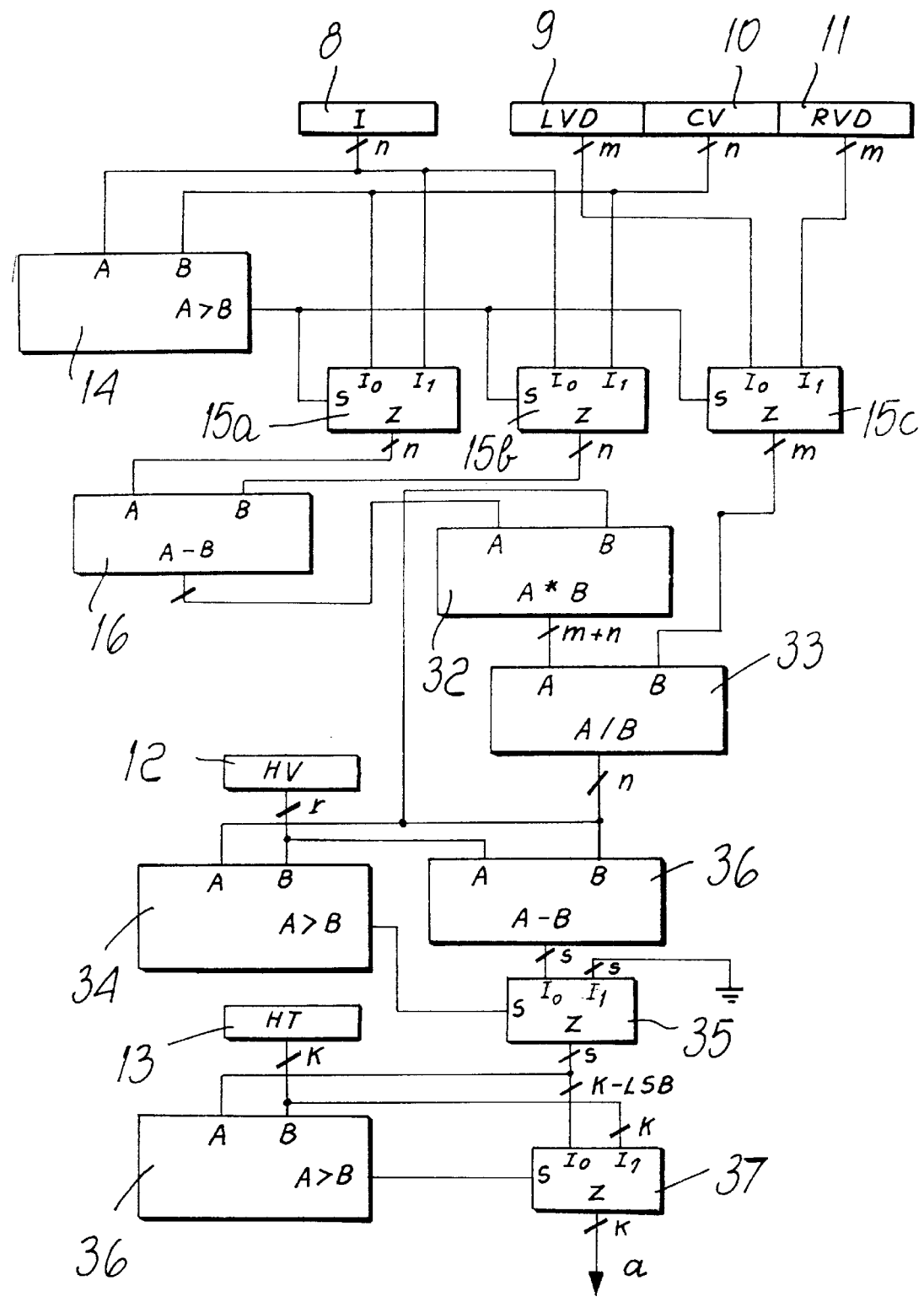
FIG. 15 is a circuit block diagram of a second embodiment of the circuit according to the present invention, related to the first embodiment of the method shown in FIG. 14.

The block diagram of the circuit that calculates the value of $\alpha$ according to the second embodiment of the method according to the present invention is shown in FIG. 15.

As in the previous case, the input variable I is stored in the register 8, and the values LVD, CV, RVD, HV, and HT are stored, respectively, in registers 9–13. The modulus comparator 14 tests the condition I>CV, and the multiplexers 15*a–c* assign the values of equations (3) and (4) to the parameters A, B, and D, respectively. More particularly, if the condition I>CV is met, the parameters of equation (4) are assigned to the parameters A, B, and D, that is to say, A=I, B=CV, and D=RVD. If the condition I>CV is not met, the parameters of equation (3) are assigned to the parameters A, B, and D, that is to say, A=CV, B=I, and D=LVD.

The outputs of the multiplexers 15*a* and 15*b* are sent to the subtracter 16, which calculates the function A−B. The output of the subtracter 16, together with the value contained in the register 12, is sent to a multiplier 32, which calculates the function HV * (A−B). The output of the multiplier 32, together with the output of the multiplexer 15*c*, is sent to a divider 33, which provides the result of the function A1=(HV * (A−B))/D. The value of A1, together with the value of HV stored in the register 12, is sent to a second modulus comparator 34, which performs the comparison A1>HV. On the basis of the result obtained, a fourth multiplexer 35 assigns the value of HV−A1, calculated by a subtracter 36, or the value of zero (logic zero), to the variable a.

The value of the variable a is sent, together with the value of HT stored in the register 13, to a third modulus comparator 36, which tests the condition a>HT. On the basis of the result obtained, a fifth multiplexer 37, which receives, as input, the output of the fourth multiplexer 35 and the output of the register 13, assigns the value of a or the value of HT to the grade of membership $\alpha$.

In this second embodiment of the present invention, the hardware execution seems to be more complex than the preceding one. A third embodiment of the present invention that offers a further simplification, leading to better results regarding the calculation of the grade of membership $\alpha$, will be described hereinafter.

In order to further simplify and reduce the hardware area dedicated to the calculation of $\alpha$, a further refinement is introduced which replaces the hardware divider with binary arithmetic shift logic, thereby changing the parameters to be stored.

Assuming that the maximum value of LVD and RVD is LVD=RVD=$2^n$-1, that is to say, LVD and RVD described with n bits, the following constants are introduced:

$$KL=(HV*2^n)/LVD$$

$$KR=(HV*2^n)/RVD$$

With the improved first embodiment of the method according to the present invention, the following values would have to be stored as significant parameters of the membership function:
KL, LVD, CV, KR, RVD, HT
and the formulae for calculating α become:
If I≤CV $$a=[KL*(I-CV+LVD)]/2^n \quad (5)$$

if a>HT then α=HT else α=a;
If I is>CV:

$$a=[KR*(CV+RVD-I)]/2^n \quad (6)$$

if a>HT then α=HT else α=a.

These formulae entail performing one subtraction, one addition, one multiplication, and one rightward shift of n bits inside the device that performs the calculation.

The improved second embodiment of the method according to the present invention yields better results because only the following values are stored as significant parameters of the membership function:
KL, CV, KR, HV, HT
and the formulae for calculating α are:
If I≤CV:

$$A1=[KL*(CV-I)]/2^n \quad (7)$$

if A1>HV then a=0 else a=HV-A1,
if a>HT then α=HT else α=a;
If I>CV:

$$A1=[KR*(I-CV)]/2^n \quad (8)$$

if A1>HV then a=0 else a=HV-A1,
if a>HT then α=HT α=a.

Accordingly, there are only two subtracters and one multiplier inside the device that performs the calculation, and the division by the value LVD or RVD has been replaced by the division by $2^n$.

An advantage of the introduction of the constants KL and KR is that it is possible to perform the division by $2^n$ simply by means of a rightward logic shift of n bits. In hardware, this is performed simply by truncating the n less significant bits of the output bus of the multiplier.

It should be noted, however, that by truncating the n less significant bits, one performs a division of integers by $2^n$ in which the remainder is constituted by the n eliminated bits. In order to obtain greater precision, the integer division, in this particular case the division by $2^n$, can be performed by over- or under-approximating. If the remainder is less than half of the divider, that is to say, less than $2^{n-1}$, then under-approximation is performed and the quotient is taken directly. If instead the remainder is greater than, or equal to, $2^{n-1}$, then over-approximation is performed and 1 is added to the quotient. In hardware, this division with approximation is performed simply by truncating the n less significant bits and adding the nth truncated bit, i.e., the most significant bit of the n-truncated bits, since if the nth bit is 1, then the remainder (that is to say, the n bits that are removed) is greater than, or equal to, $2^{n-1}$, and therefore over-approximation is performed by adding 1 to the quotient; otherwise, under-approximation is performed by adding 0.

It is specified that the division is eliminated inside the device that performs the calculation by introducing the constants KL and KR, whereas the parameters that identify the membership function are LVD, CV, RVD, HV, and HT.

In the calculation of KL or KR, which is performed in software during compiling, multiplication by $2^n$ is performed so as to avoid losing precision in the division of integers by LVD or RVD, which during compiling is always performed as a division by integers with over- or under-approximation.

Figure 16:
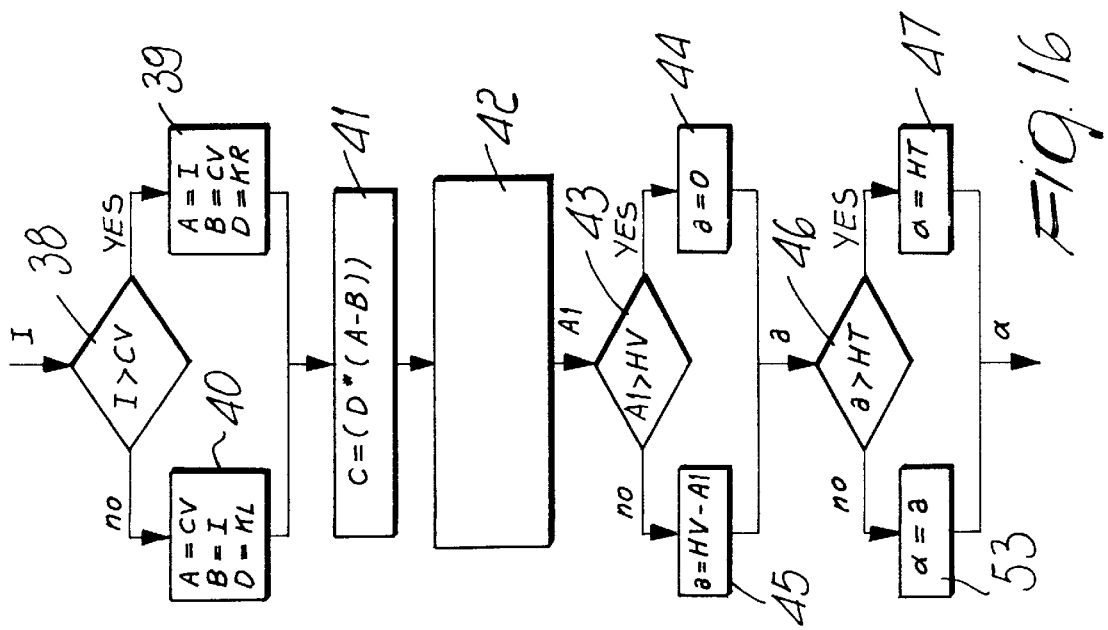
FIG. 16 is a flowchart of an improved version of the second embodiment of the method according to the present invention shown in FIG. 14.

The flowchart of the improved version of the second embodiment of the method according to the present invention is shown in FIG. 16.

Initially, the condition I>CV is tested by the block 38. If this condition is true, the parameters of equation (8) are assigned to the parameters A, B, and D by means of the block 39, that is to say, A=I, B=CV, and D=KR. If the condition I>CV is false, the values of equation (7) are assigned to the parameters A, B, and D by means of block 40, that is to say, A=CV, B=I, andD=KL.

The parameters A, B, and D are then introduced, by means of block 41, in the generic formula of equations (7) and (8), that is to say, in the formula C=(D * (A–B)). The value C is sent to block 42, which determines the value A1 of FIGS. 10 and 11. The n less significant bits are truncated from the value C, and the most significant bit of the n truncated less significant bits is added to the result. In this manner the value A1 is obtained, which is sent to block 43, which tests the condition A1>RV. If this condition is met, the value a is set to zero by means of block 44. If instead the condition A1>HV is false, the value a is set to (HV-A1) by means of block 45.

The value of a is sent to block 46, which tests the condition a>HT. If this condition is met, the grade of membership α is set to the value of HT by means of block 47. If instead the condition a>HT is false, the grade of membership α is set to the value of α by block 53.

Figure 17:
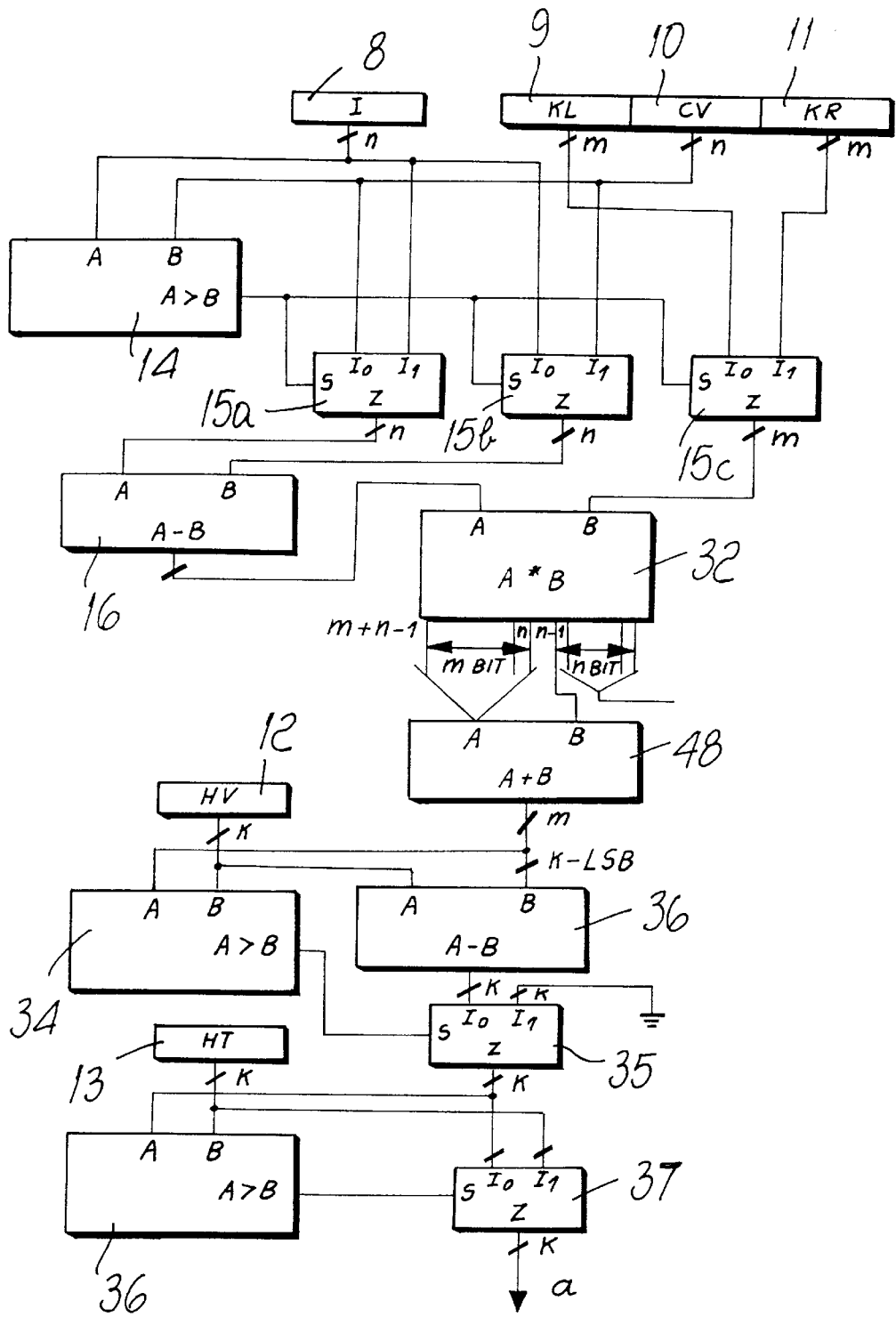
FIG. 17 is a block diagram of the activation circuit of the improved version of the second embodiment of the method according to the present invention shown in FIG. 16.

The block diagram of the activation circuit of the second embodiment of the improved version of the second embodiment of the method according to the present invention of FIG. 16 is shown in FIG. 17.

The circuit is substantially identical to the circuit for the activation of the second embodiment of the method according to the present invention, shown in FIG. 15, with the exception that the stored parameters of the membership function are now KL, CV, KR, HV, and HT, which are stored in the registers 9–13, respectively. The other difference is that an adder 48 now replaces the divider 33 and receives, as input, the bits that have not been eliminated by the division by $2^n$ and the most significant bit of the unused truncated n less significant bits.

In particular, the modulus comparator 14 tests the condition I>CV, which in turn, on the basis of the result obtained, drives the multiplexers 15a–c, which assign the parameters of equations (7) and (8) to the parameters A, B, and D, i.e., the function performed by the blocks 39 and 40 of FIG. 16. The values of the parameters A and B are sent by the multiplexers 15a and 15b to the subtracter circuit 16, which calculates the function A-B. The result of this function is multiplied by the multiplier 32 together with the value of the parameter D originating from the multiplexer 15c. At the output of the multiplier 32, the n less significant bits are eliminated, except for the most significant one, which is added to the output of the multiplier 32 by means of the adder 48. In this manner, the parameter A1 of FIGS. 10 and 11 is obtained and is then processed as in the embodiment of FIG. 15.

The storing of parameters of the triangular and pentagonal or hexagonal membership function at the borders of the universe of discourse, and the corresponding calculation of the value of α, will now be discussed.

Storing the above mentioned membership functions allows one to describe a greater number of membership functions. In addition, by introducing restrictions to the parameters that describe the membership functions, it is possible to describe subsets of membership functions with a smaller number of bits of information. The following description will not discuss all the various possible cases, but will merely describe a particular case in which a ratio between the membership functions and the information bits is very high. One of ordinary skill in the art, however, would understand how this could be done in the other possible cases.

In describing trapezoidal membership functions, by storing the altitude of the triangle and of the trapezoid, assuming HV=HT=value max of the degree of truth, it is possible to describe, with a reduced number of information bits, the triangular, pentagonal, or right-angled trapezoidal membership functions at the borders of the UdD the vertex whereof is at the maximum value of the degree of truth.

In this case, the representation of the membership functions is based on storing only three characteristic parameters of the membership function and setting the altitude of the vertex of the membership function to the value of the degree of truth, max.

The characteristic parameters used to unambiguously identify the membership functions are the position of the vertex CV in the UdD and the distance related to the vertex of the points of intersection between the two sides of the triangle and the axis that represents the UdD, that is to say, the distances LVD and RVD. These parameters have each been discussed above and are shown in FIG. 18.

As shown in FIG. 31, a memory word can store the characteristics, LVD, CV and RVD. It is not necessary to include the maximum value of the degree of truth max since this is a known value for all membership functions.

The dimensions, in bits, of the three parameters are a function of the number of membership functions to be described. It is recommended that CV have a number of bits that is equal to the number of bits that discretizes the UdD and, in order to have a large number of membership functions, that LVD and RVD have a greater or equal number of bits.

In order to describe degenerate membership functions without increasing the number of bits of the above mentioned parameters, the following conventions are set:
  a) If LVD or RVD is equal to 0, the plot of the membership function is horizontal in the corresponding left or right side.
  b) If LVD and RVD are both equal to zero, there are two cases:
    (i) If the number of bits that defines CV is greater than, or equal to, the number of bits that describes the degree of truth, then the value of CV yields directly the value of α. That is to say, the plot of the membership function is horizontal throughout the UdD with the degree of truth equal to the value indicated in CV.
    (ii) If the number of bits that defines CV is less than the number of bits that describes the degree of truth, then it is possible to proceed in two ways:
      the value of CV indicates whether one is dealing with the membership function that is entirely at the value max, if CV is different from zero, or with the function that is entirely at the value 0, if CV=0; or
      the value of CV gives the value of α, appropriately discretized. In other words, the plot of the membership function is horizontal throughout the UdD with the degree of truth equal to the value indicated in CV multiplied by a discretization parameter calculated as the maximum degree of truth divided by the maximum value of CV.

Figure 21:
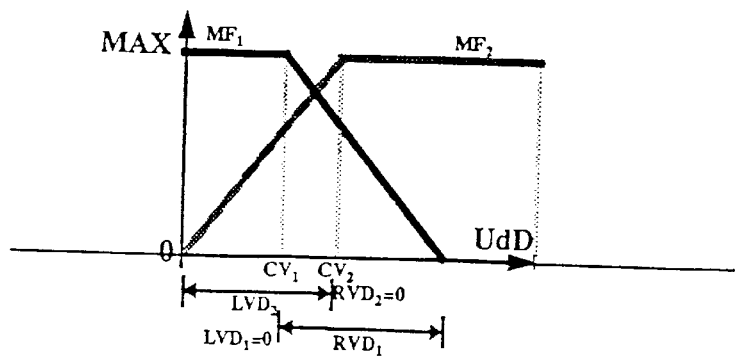
FIG. 21 shows examples of membership functions having the shape of right-angled trapezoids with the distance restriction LVD or RVD.
Figure 22:
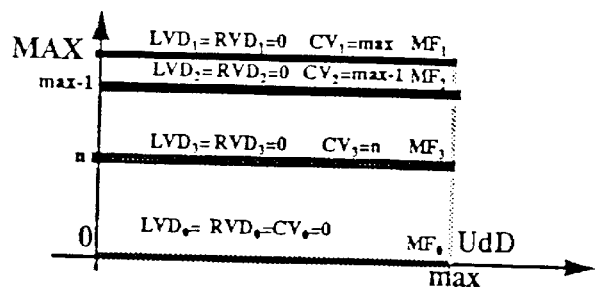
FIG. 22 shows examples of horizontal membership functions when the number of bits that defines CV is greater than, or equal to, the number of bits that describes the degree of truth.
Figure 23:
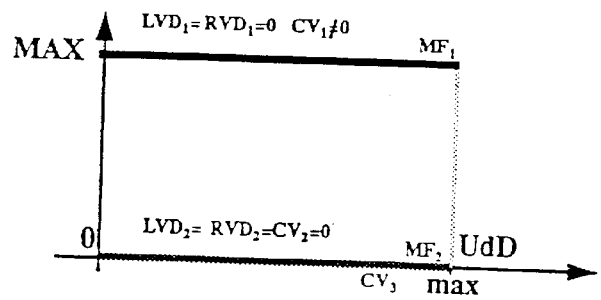
FIG. 23 shows examples of horizontal membership functions of a first case if the number of bits that defines CV is less than the number of bits that describes the degree of truth.
Figure 24:
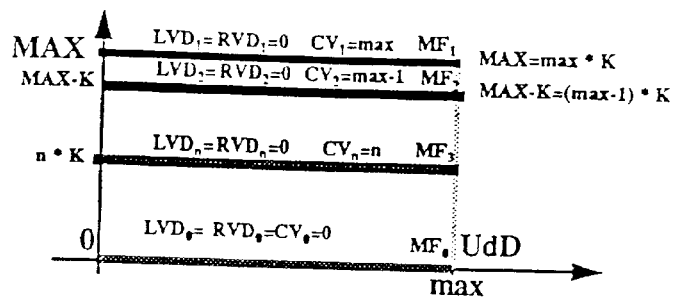
FIG. 24 shows examples of horizontal membership functions of a second case, if the number of bits that defines CV is less than the number of bits that describes the degree of truth.
Figure 25:
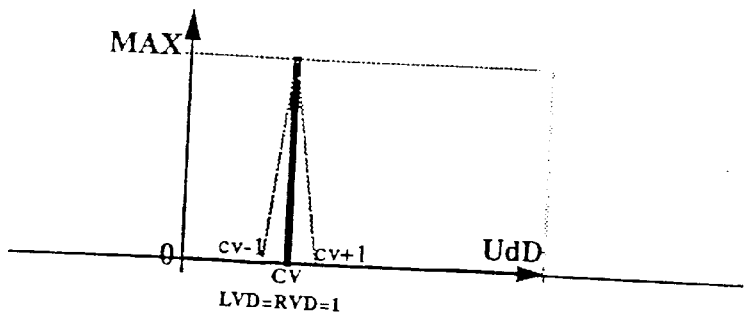
FIG. 25 is an example of a crisp function.

Assuming that CV has a number of bits equal to the number of bits that discretizes the UdD and that LVD and RVD have a greater or equal number of bits, in this particular case the membership functions that can be described are:
  (i) All membership functions of the triangular type with the vertex at the maximum value of the degree of truth, as shown in FIG. 19.
  (ii) All membership functions of the pentagonal type framed in the border of the UdD, with the restriction of the distance LVD and RVD as shown in FIG. 20;
  (iii) All membership functions that have a right-angled trapezoid-type shape with the distance restriction LVD and RVD as shown in FIG. 21.
  (iv) The degenerate membership functions defined by:
    a) If the number of bits that defines CV is greater than, or equal to, the number of bits that describes the degree of truth, then the value of CV directly yields the value of α. That is to say, the plot of the membership function is horizontal throughout the UdD with the degree of truth equal to the value indicated in CV, as shown in FIG. 21.
    b) If the number of bits that defines CV is less than the number of bits that describes the degree of truth, then there are two cases:
      the value of CV indicates whether one is dealing with the membership function that is entirely at the value max (MF1), if CV is different from zero, or with the membership function that is entirely at the value zero (MF2), if CV=0, as shown in FIG. 23; or
      the value of CV yields the value of α, appropriately discretized. In other words, the plot of the membership function is horizontal throughout the UdD with the degree of truth equal to the value indicated in the CV multiplied by a discretization parameter K, calculated as the maximum degree of truth divided by the maximum value of CV, as shown in FIG. 24.
  (v) All crisp membership functions. That is to say, the membership function that is always zero except in CV, which assumes the truth value max, as shown in FIG. 25. This crisp membership function is not represented by LVD=RVD=0, as would seem more logical, since the membership function LVD=RVD=1 behaves, for the calculation of the value of α, like the crisp function, and therefore it is used like a crisp function, whereas the coding LVD=0 or RVD=0 is given the meaning of a horizontal side.

In the case of triangular membership functions, the value of α is calculated in a manner that is similar to the preceding cases, with the exception that in this case no comparison with HT is performed, since the value that is obtained is directly the value $\alpha$. The formulae for calculating the value of $\alpha$ are given hereinafter, considering the above mentioned membership functions with the specification that, among the degenerate functions, only the one that is entirely at the maximum value max is taken and is indicated by LVD=RVD=0 and any value of CV.

Figure 26:
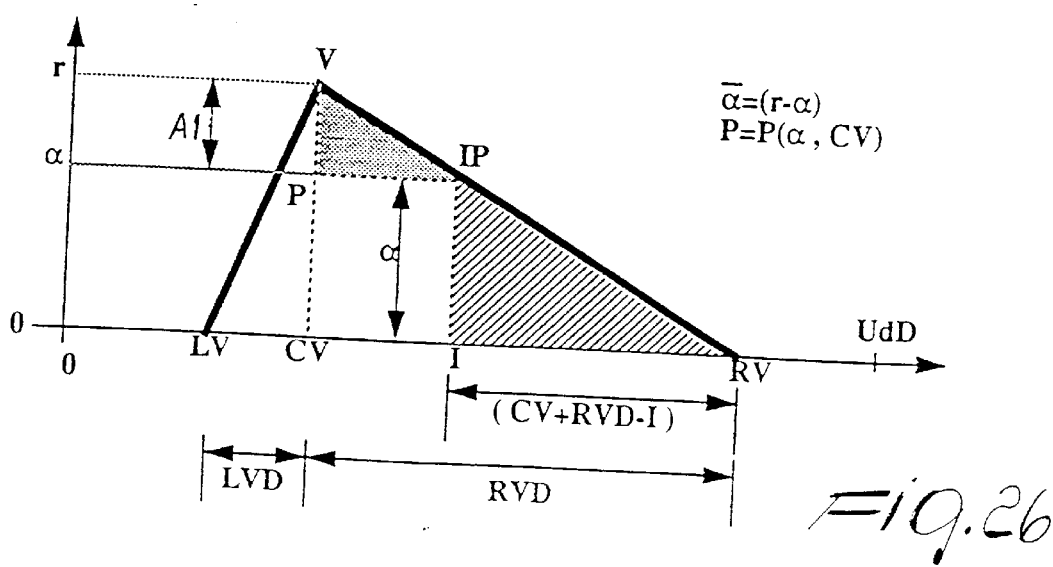
FIG. 26 is a parametric representation of a triangular membership function with I>CV.

With reference to FIG. 26, if I is the value of the input variable and r is the value max of the degree of truth, fuzzification of the input value is achieved by adopting the geometric proportions that occur between homologous sides of similar triangles.

For I>CV, the following proportion holds as regards the similar right-angled triangles V-CV-RV and IP-I-RV:

$$\alpha:(CV+RVD-I)=r:RVD$$

from which:

$$\alpha=[r*(CV+RVD-I)]/RVD \qquad (9)$$

in this case, the value $\alpha$ is directly obtained.

The fuzzy rules that are computed involve both the value of $\alpha$ and the negation of $\alpha$ ($\overline{\alpha}$) which is calculated as the complemented value of $\alpha$ with respect to the maximum degree of truth, that is to say, $\overline{\alpha}=r-\alpha$. In order to simplify the hardware, it is possible to directly calculate the negation ($\overline{\alpha}$) and then obtain the optional value $\alpha$. With reference to the similar right-angled triangles V-CV-RV and V-P-IP, the following proportion is written:

$$A1:r=(I-CV):RVD$$

and the value of A is obtained therefrom:

$$A1=[r*(I-CV)]/RVD \qquad (10)$$

If A1>r then $\overline{\alpha}$=r else $\overline{\alpha}$=A1

This last check is performed because the value A1 that is obtained is greater than r if the input I is greater than RV. In this case the value $\overline{\alpha}$ is equal to the value max of the degree of truth, that is to say, r.

The value of $\alpha$ is instead:

$$\alpha=r-\overline{\alpha}$$

Figure 27:
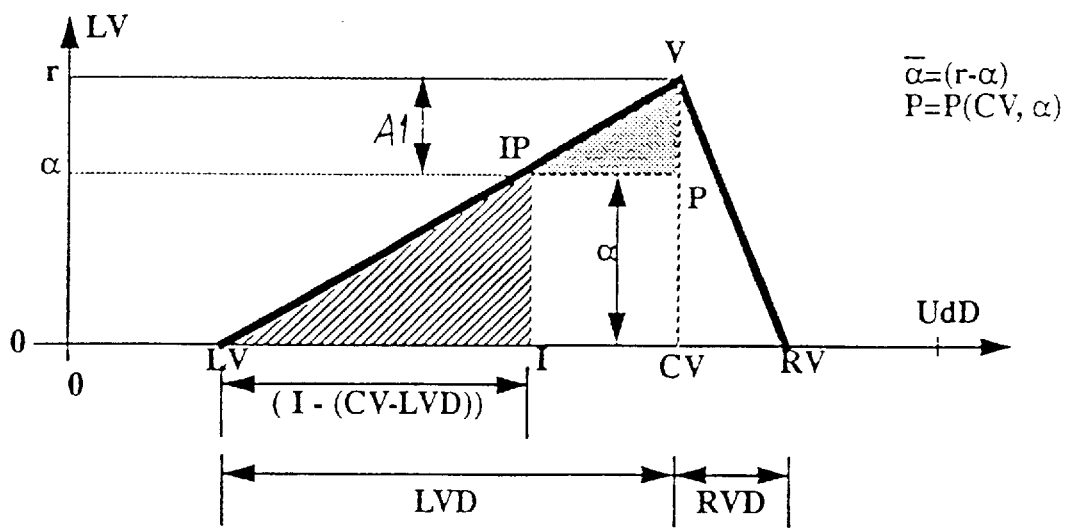
FIG. 27 is a parametric representation of a triangular membership function with I≦CV.

With reference to FIG. 27, the same reasoning is applied to the left for I≦CV by using LVD.

As regards the similar right-angled triangles V-CV-LV and IP-IL-V, it is possible to write the following proportion:

$$\alpha:(I-(CV-LVD))=r:LVD$$

from which:

$$\alpha=[r*(I-(CV-LVD))]/LVD \qquad (11)$$

In this case, the value $\alpha$ is directly obtained. Instead, since it is useful to calculate the value of the negation of $\alpha$ ($\overline{\alpha}$) as well, the following proportion is written with reference to the similar right-angled triangles V-CV-LV and V-P-IP:

$$A1:r=(CV-I):LVD$$

from which:

$$A1=[r*(CV-I)]/LVD \qquad (12)$$

If A1>r then $\overline{\alpha}$=r else $\overline{\alpha}$=A1.

According to the above statements, the calculation of the negation of $\overline{\alpha}$ is performed with the following formulae:

If the input I is less than, or equal to, CV:

$$A1=[r*(CV-I)]/LVD \qquad (12)$$

if A1>r then $\overline{\alpha}$=r else $\overline{\alpha}$=A1.
If the input I is greater than CV:

$$A1=[r*(I-CV)]/RVD \qquad (10)$$

if A1>r then $\overline{\alpha}$=r else $\overline{\alpha}$=A1.

These two formulae entail performing one subtraction, one multiplication, and one division inside the chip. It should also be noted that once the membership function has been set, the values CV, LVD, and RVD are set, whereas the input value I varies.

In this case, too, in order to further simplify and reduce the hardware area assigned to the calculation of the value of $\alpha$, an additional refinement has been introduced that allows one to replace the hardware divider with an arithmetic shift.

Assuming that the maximum value of LVD and RVD is LVD=RVD=$2^n-1$, the following constants are introduced:

$$KL=(r*2^n)/LVD$$

$$KR=(r*2^n)/RVD$$

and the following values are stored as significant parameters of the membership function:

KL, CV, KR

Therefore the formulae for calculating the value of $\alpha$ are:
If the input I is less than, or equal to, CV:

$$A1=[KL*(CV-I)]/2^n \qquad (13)$$

if A1>r then $\overline{\alpha}$=r else $\overline{\alpha}$=A1;
If the input I is greater than CV:

$$A1=[KR*(I-CV)]/2^n \qquad (14)$$

if A1>r then $\overline{\alpha}$=r else $\overline{\alpha}$=A1.

Accordingly, the chip contains only one subtracter and one multiplier, whereas the division has been replaced by a rightward logic shift of n bits which, in hardware, is performed simply by truncating the n less significant bits of the output bus of the multiplier.

It is specified that the division is eliminated inside the chip by virtue of the introduction of the constants KL and KR, whereas the parameters that identify the membership function are LVD, CV, and RVD.

In the calculation of KL or KR, which is performed in software during compiling, multiplication by $2^n$ is performed so as to avoid losing precision in the division of integers by LVD or RVD which, during compiling is always performed as a division by integers with over- or under-approximation.

Figure 28:
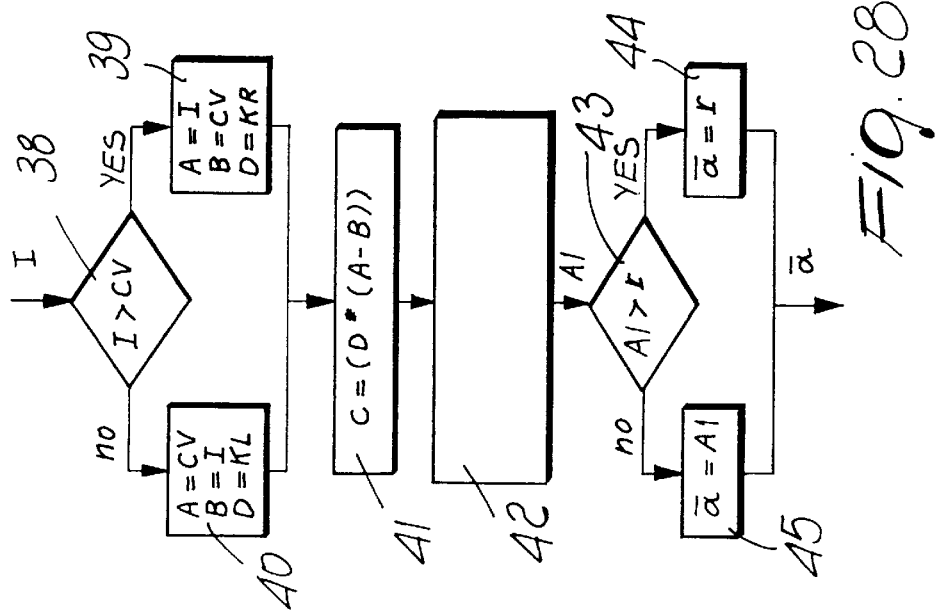
FIG. 28 is a flowchart of a third improved embodiment of the method according to the present invention adapted to calculate the negation of α.

The flowchart of the third improved embodiment of the method according to the present invention based on these last formulae is shown in FIG. 28.

Initially, block 38 tests the condition I>CV. If the result of this test is positive, block 39 assigns the values of formula (14) to the parameters A, B, and D. If instead the condition I>CV is not met, the values of formula (13) are assigned to the parameters A, B, and D by block 40.

Block 41 then calculates the value C=(D * (A−B)), which is a part of the generic formula of formulae (13) and (14). The value C is then sent to block 42, which first of all removes the n less significant bits and then adds the most significant bit of the n truncated bits to the result.

This produces the value of A1, which is compared in the condition A1>r by means of block 43. If the result of the comparison is positive, the value of r is assigned to the value of the negation of α ($\overline{\alpha}$) by means of block 44. If instead the condition A1>r is not met, block 45 assigns the value of A1 to the value of $\overline{\alpha}$.

Figure 29:
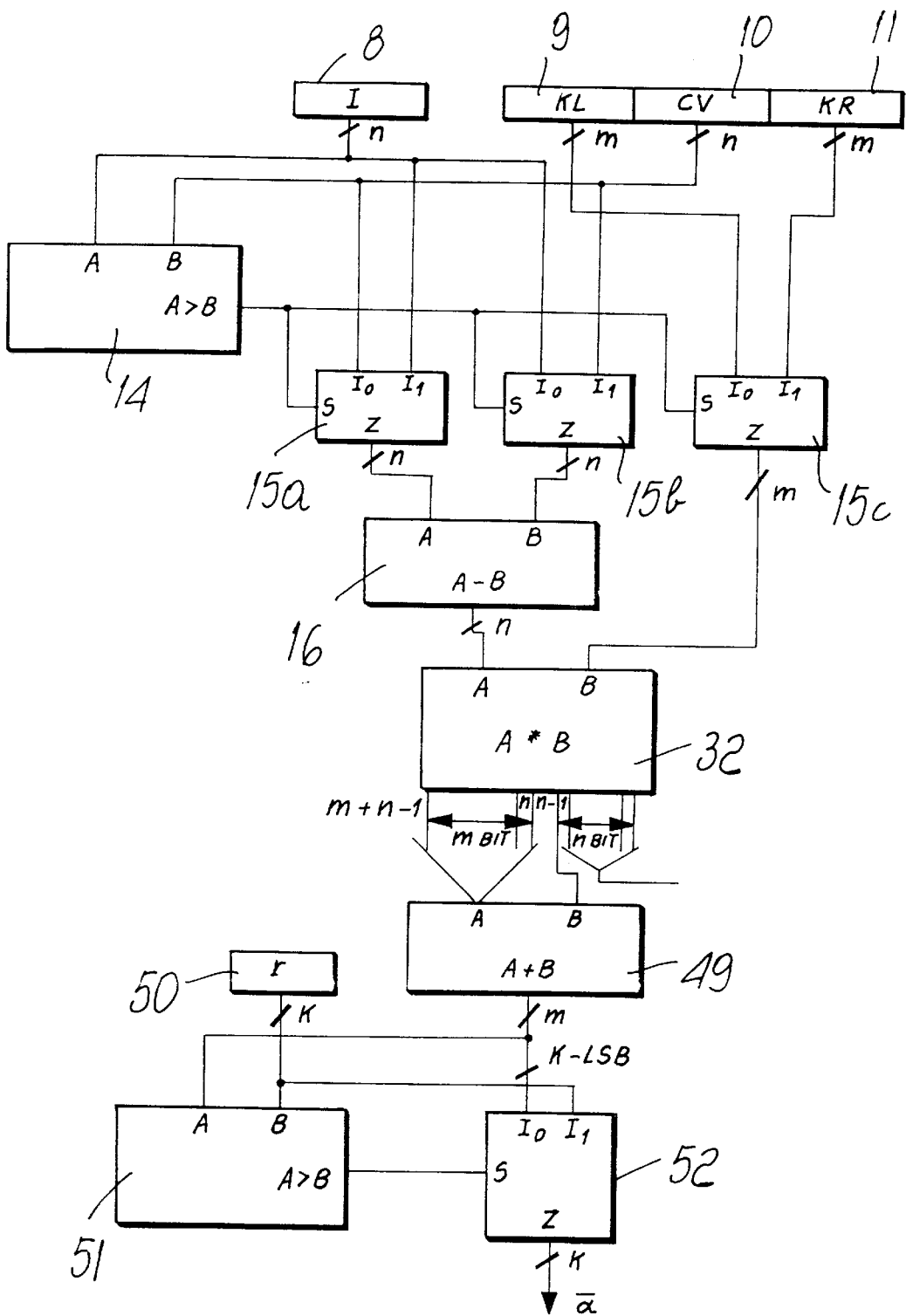
FIG. 29 is a diagram of the activation circuit of the method according to FIG. 28.

FIG. 29 illustrates an embodiment for a circuit to perform the method shown in FIG. 28.

As in the previous circuits, the input variable I is stored in the register 8, whereas the characteristic parameters of the membership function KL, CV, and KR are stored respectively in the registers 9–11. The value r, which is equal for all the membership functions, is stored in the register 50.

The modulus comparator 14 tests the condition I>CV. On the basis of the result obtained, the values of formulae (13) or (14) are assigned to the parameters A, B, and D respectively by means of the multiplexers 15a–c. The values A and B provided by the multiplexers 15a and 15b are subtracted from one another (A-B) by the subtracter 16. The result of this operation is sent to the multiplier 32, which multiplies the value (A-B) by the value of D, which is provided by the multiplexer 15c. At the output of the multiplier 32, the n less significant bits are eliminated and the most significant bit of the n less significant bits is added to the result by means of adder 49. The output of adder 49 is the value A1 of FIGS. 26 and 27. This value is compared, by means of the comparator 51, with the value of r, which is provided by the register 50, in the condition A1>r. On the basis of the result obtained, the multiplexer 52 gives the value of r or the value of A1 to the value of the negation of α ($\overline{\alpha}$). The subsequent calculation of α is obvious and can be performed with the formula α=r-$\overline{\alpha}$.

From the above description it is evident that the present invention fully achieves the intended aim and objects.

Of course, it is possible for one of ordinary skill in the art to develop a corresponding circuit and flowchart for an embodiment of the method according to the present invention defined by formulae (9) and (11), that is to say, a non-improved version of the method and circuit of FIGS. 28 and 29.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. An apparatus for calculating a grade of membership of an antecedent part of a fuzzy rule, comprising:

means for receiving an input value I;

means for fuzzifying the input value by determining geometric proportions of homologous sides of similar first and second triangles, the first triangle defining a membership function and a position of the input value in a universe of discourse and its intersection with the membership function defining the second triangle; and means for calculating the grade of membership as a function of the determined geometric proportions, wherein the means for fuzzifying comprises:

a first register for storing the input value I;

a second register for storing a position of a vertex of the first triangle that defines the membership function in the universe of discourse;

a third register for storing a first distance between said position of the vertex in the universe of discourse and a point of intersection between a left side of the first triangle that defines the membership function and an axis of the universe of discourse;

a fourth register for storing a second distance between said position of the vertex in the universe of discourse and a point of intersection between a right side of the first triangle that defines the membership function and the axis of the universe of discourse;

a fifth register for storing a first altitude value HV of said first triangle that defines the membership function;

a sixth register for storing a second altitude value HT of a trapezoid defined by said first triangle that defines the membership function;

a first modulus comparator that receives, as inputs, outputs of said first and second registers, said first modulus comparator outputting a signal having a first value if the output of the first register is greater than the output of the second register and a second value, different from the first value, if the output of the first register is not greater than the output of the second register;

a first multiplexer connected to the output of the first modulus comparator, the first register and the second register and selecting the value of said second register if said first modulus comparator output is the first value, said first multiplexer otherwise selecting said value of said first register;

a second multiplexer connected to the output of the first modulus comparator, the first register and the second register and selecting the value of said first register if said first modulus comparator output is the first value, said second multiplexer otherwise selecting said value of said second register;

a third multiplexer connected to the output of the first modulus comparator, the third register and the fourth register and selecting the value of said fourth register if said first modulus comparator output is the first value, said third multiplexer otherwise selecting said value of said third register;

calculating means connected to said first, second and third multiplexers and said fifth register, said calculating means for solving the following calculation:

$$a=(HV*(A-B+D))/D$$

where HV is the value stored in the fifth register, A is the value selected by said first multiplexer, B is the value selected by said second multiplexer, and D is the value selected by said third multiplexer;

a second modulus comparator which receives the value a from the calculating means and the value HT stored in the sixth register and outputs a signal having a first value if a>HT otherwise outputting a signal having a second value; and a fourth multiplexer, which is driven by said second modulus comparator, is connected to said sixth register and to said calculating means which provide the value of a, and is adapted to select the value HT if the second comparator output signal is the first value and to otherwise select the value of a.

2. The apparatus according to claim 1, wherein the calculating means comprises:

a first subtractor which receives the output of the first multiplexer and the output of the second multiplexer and outputs a value equal to the output of the first multiplexer minus the output of the second multiplexer;

an adder which receives the output of the first subtractor and the output of the third multiplexer and outputs a signal having a value equal to a sum of the output of the first subtractor and the output of the third multiplexer;

a multiplier which receives the value HV stored in the fifth register and the output of the adder and outputs a signal having a value equal to the value HV multiplied by the output of the adder; and a divider which receives the output of the multiplier and the output of the third multiplexer and outputs a signal having a value equal to the output of the multiplier divided by the output of the third multiplexer.

3. An apparatus for calculating a grade of membership of an antecedent part of a fuzzy rule, comprising:

means for receiving an input value I;

means for fuzzifying the input value by determining geometric proportions of homologous sides of similar first and second triangles, the first triangle defining a membership function and a position of the input value in a universe of discourse and its intersection with the membership function defining the second triangle; and means for calculating the grade of membership as a function of the determined geometric proportions, wherein the means for fuzzifying comprises:

a first register for storing the input value I;

a second register for storing a position of a vertex of the first triangle that defines the membership function in the universe of discourse;

a third register for storing a first distance between said position of the vertex in the universe of discourse and a point of intersection between a left side of the first triangle that defines the membership function and an axis of the universe of discourse;

a fourth register for storing a second distance between said position of the vertex in the universe of discourse and a point of intersection between a right side of the first triangle that defines the membership function and the axis of the universe of discourse;

a fifth register for storing a first altitude HV of said first triangle that defines the membership function;

a sixth register for storing a second altitude HT of a trapezoid defined by said first triangle that defines the membership function;

a first modulus comparator that receives, as inputs, outputs of said first and second registers, said first modulus comparator outputting a signal having a first value if the output of the first register is greater than the output of the second register and a second value, different from the first value, if the output of the first register is not greater than the output of the second register;

a first multiplexer connected to the output of the first modulus comparator, the first register and the second register and selecting the value of said first register if said first modulus comparator output is the first value, said first multiplexer otherwise selecting said value of said second register;

a second multiplexer connected to the output of the first modulus comparator, the first register and the second register and selecting the value of said second register if said first modulus comparator output is the first value, said second multiplexer otherwise selecting said value of said first register;

a third multiplexer connected to the output of the first modulus comparator, the third register and the fourth register and selecting the value of said fourth register if said first modulus comparator output is the first value, said third multiplexer otherwise selecting said value of said third register;

calculating means connected to said first, second and third multiplexers and to said fifth register, said calculating means for solving the following calculation:

$$A1 = (HV^*(A-B))/D$$

where HV is the value stored in the fifth register, A is the value selected by said first multiplexer, B is the value selected by said second multiplexer, and D is the value selected by said third multiplexer, a second modulus comparator which receives the value A1 from the calculating means and the value HV from the fifth register and outputs a signal having a first value if A1>HV otherwise outputting a signal having a second value;

a subtractor which receives the value A1 from the calculating means and the value HV from the fifth register and outputs the value HV−A1;

a fourth multiplexer, which is driven by said second modulus comparator and is connected to the output of the subtractor and to ground representing a zero value and is adapted to select the zero value if the second modulus comparator signal is the first value and to otherwise select the value output by the subtractor;

a third modulus comparator which receives the output of the fourth multiplexer and the value HT stored in the sixth register and outputs a signal having a first value if the output of the fourth multiplexer is greater than HT otherwise outputting a signal having a second value; and a fifth multiplexer, which is driven by said third comparator and is connected to the output of the fourth multiplexer and the sixth register and is adapted to select the value of said sixth register if the third modulus comparator signal is the first value and to otherwise select the output value of said fourth multiplexer.

4. The apparatus according to claim 3, wherein the calculating means comprises:

a first subtractor which receives the output of the first multiplexer and the output of the second multiplexer and outputs a value equal to the output of the first multiplexer minus the output of the second multiplexer;

a multiplier which receives the value HV stored in the fifth register and the output of the first subtracter and outputs a signal having a value equal to the value HV multiplied by the output of the first subtracter; and a divider which receives the output of the multiplier and the output of the third multipexer and outputs a signal having a value equal to the output of the multiplier divided by the output of the third multiplexer.

5. An apparatus for calculating a grade of membership of an antecedent part of a fuzzy rule, comprising:

means for receiving an input value I;

means for fuzzifying the input value by determining geometric proportions of homologous sides of similar first and second triangles, the first triangle defining a membership function and a position of the input value in a universe of discourse and its intersection with the membership function defining the second triangle;

means for calculating the grade of membership as a function of the determined geometric proportions;

a first register for storing the input value I;

a second register for storing a position CV of a vertex of the first triangle that defines the membership function in the universe of discourse;

a third register for storing a first parameter KL defined by multiplying a maximum degree of truth by $2^n$ and dividing by a first distance between said position of the vertex in the universe of discourse and a point of intersection between a left side of the first triangle that defines the membership function and an axis of the universe of discourse;

a fourth register for storing a second parameter KR defined by multiplying the maximum degree of truth by $2^n$ and dividing by a second distance between said position of the vertex in the universe of discourse and a point of intersection between a right side of the first triangle that defines the membership function and the axis of the universe of discourse;

the value of n being a number of bits with which said first and second distances are defined;

a fifth register for storing a first altitude HV of said first triangle that defines the membership function;

a sixth register for storing a second altitude HT of a trapezoid defined by said first triangle that defines the membership function;

a first modulus comparator that receives, as inputs, outputs of said first and second registers, said first modulus comparator outputting a signal having a first value if the output of the first register is greater than the output of the second register and a second value, different from the first value, if the output of the first register is not greater than the output of the second register;

a first multiplexer connected to the output of the first modulus comparator, the first register and the second register and selecting the value of the first register if said first modulus comparator output is the first value, said first multiplexer otherwise selecting said value of said second register;

a second multiplexer connected to the output of the first modulus comparator, the first register and the second register and selecting the value of said second register if said first modulus comparator output is the first value, said second multiplexer otherwise selecting said value of said first register;

a third multiplexer connected to the output of the first modulus comparator, the third register and the fourth register and selecting the value of said fourth register if said first modulus comparator output is the first value, said third multiplexer otherwise selecting said value of said third register;

calculating means connected to said first, second and third multiplexers and adapted to perform the following calculation:

$$C=(D*(A-B))$$

where A is the value selected by said first multiplexer, B is the value selected by said second multiplexer, and D is the value selected by said third multiplexer, and outputting the value C represented by m+n number of bits;

an adder which receives a value equal to the n+1 through m+n most significant bits from the computing means and the $n^{th}$ bit value and outputs a sum of the n+1 through m+n value and the nth bit value;

a second modulus comparator which receives the output from the adder and the value HV from the fifth register and outputs a signal having a first value if the output of the adder is greater than HV otherwise outputting a signal having a second value;

a subtractor which receives the output of the adder and the value HV stored in the fifth register and outputs a value equal to HV minus the output of the adder;

a fourth multiplexer, which is driven by said second modulus comparator and is connected to the output of the subtractor and to ground representing a zero value and is adapted to select the zero value if the second modulus comparator signal is the first value and to otherwise select the value output by the subtractor;

a third modulus comparator which receives the output of the fourth multiplexer and the value HT stored in the sixth register and outputs a signal having a first value if the output of the fourth multiplexer is greater than HT otherwise outputting a signal having a second value; and a fifth multiplexer, which is driven by said third comparator and is connected to the output of the fourth multiplexer and the sixth register and is adapted to select the value of said sixth register if the third modulus comparator signal is the first value and to otherwise select the output value of said fourth multiplexer.

6. The apparatus according to claim 5, wherein the calculating means comprises:

a subtractor which receives the output A from the first multiplexer and the output B output from the second multiplexer and outputs a value A−B; and a multiplexer which receives the output A−B from the subtractor and the value D from the third multiplexer and outputs the value D*(A−B) represented with m+n bits.

7. An apparatus for calculating a grade of membership of an antecedent part of a fuzzy rule, comprising:

means for receiving an input value I;

means for fuzzifying the input value by determining geometric proportions of homologous sides of similar first and second triangles, the first triangle defining a membership function and a position of the input value in a universe of discourse and its intersection with the membership function defining the second triangle;

means for calculating the grade of membership as a function of the determined geometric proportions;

a first register for storing the input value I;

a second register for storing a position CV of a vertex of the first triangle that defines the membership function in the universe of discourse;

a third register for storing a first parameter KL defined by multiplying a maximum degree of truth by $2^n$ and by dividing by a first distance between said position of the vertex in the universe of discourse and a point of intersection between a left side of the first triangle that defines the membership function and an axis of the universe of discourse;

a fourth register for storing a second parameter KR that is defined by multiplying the maximum degree of truth by $2^n$ and by dividing by a second distance between said position of the vertex in the universe of discourse and a point of intersection between a right side of the first triangle that defines the membership function and the axis of the universe of discourse;

the value of n being a number of bits with which said first and second distances are defined;

a fifth register for storing a maximum altitude r of said first triangle that defines the membership function;

a first modulus comparator that receives, as inputs, outputs of said first and second registers, said first modulus comparator outputting a signal having a first value if the output of the first register is greater than the output of the second register and a second value, different from the first value, if the output of the first register is not greater than the output of the second register;

a first multiplexer connected to the output of the first modulus comparator, the first register and the second register and selecting the value of the first register if said first modulus 11 comparator output is the first value, otherwise selecting said value of said second register;

a second multiplexer connected to the output of the first modulus comparator, the first register and the second register and selecting the value of said second register if the output of the first comparator is the first value, otherwise selecting said value of said first register;

a third multiplexer connected to the output of the first modulus comparator, the third register and the fourth register and selecting the value of the fourth register if the first modulus output is the first value, otherwise selecting said value of the third register;

calculating means connected to said first, second and third multiplexers adapted to perform the following calculation:

$$C=(D*(A-B))$$

where A is the value selected by said first multiplexer, B is the value selected by said second multiplexer, and D is the value selected by said third multiplexer, and outputting the value C represented by m+n number of bits;

an adder which receives a value equal to the n+1 through m+n most significant bits of the output C from the computing means and the $n^{th}$ bit value;

a second modulus comparator which receives the output from the adder and the maximum altitude r stored in the fifth register and outputs a signal having a first value if the output of the adder is greater than r otherwise outputting a signal having a second value; and a fifth multiplexer being driven by said second comparator and connected to the fifth register and the output of the adder and being adapted to select the value of said fifth register if said second comparator is the first value otherwise selecting the value of said output of said adder.

8. The apparatus according to claim 7, wherein the calculating means comprises:

a subtractor which receives the output A from the first multiplexer and the output B output from the second multiplexer and outputs a value A−B; and a multiplexer which receives the output A−B from the subtractor and the value D from the third multiplexer and outputs the value D*(A−B) represented with m+n bits.

9. An apparatus for calculating a grade of membership α of an antecedent part of a fuzzy rule comprising:

storing device that stores an input value I, a value CV defining a position of a vertex of a triangle that defines a membership function in a universe of discourse, a value LVD defining a first distance between the position CV of the vertex and a point of intersection between a left side of the triangle that defines the membership function and an axis of the universe of discourse, a value RVD defining a second distance between the position CV of the vertex and a point of intersection between a right side of the triangle that defines the membership function and the axis of the universe of discourse, a first altitude value HV of said triangle and a second altitude value HT of a trapezoid defined by said triangle;

a comparator connected to the storing device that compares I and CV and that outputs a first comparator signal at a first value when I>CV otherwise outputting the first comparator signal at a second value;

a first grade calculating circuit connected to the comparator and the storing device that calculates and outputs a value a=(HV*(CV−I+RVD))/RVD when the first comparator signal is the first value, otherwise outputting a=(HV*(I−CV+LVD))/LVD; and a second grade calculating circuit connected to the first grade calculating circuit and the storing device that calculates and outputs the value α equal to HT when a>HT otherwise outputting the value α=a, wherein the first grade calculating circuit comprises:

a first multiplexer that receives the first comparator signal, the input value I and the value CV and that outputs the input value I when the first comparator signal is at the first value, otherwise outputting the value CV;

a second multiplexer that receives the first comparator signal, the value CV and the input value I and that outputs the value CV when the first comparator signal is at the first value, otherwise outputting the value I;

a third multiplexer that receives the first comparator signal, the value LVD and the value RVD and that outputs the value LVD when the first comparator signal is at the first value, otherwise outputting the value RVD; and a first calculating circuit that outputs a value equal to the output of the second multiplexer subtracted from the output of the first multiplexer and added to the output of the third multiplexer;

a second calculating circuit that multiplies the output of the first calculating circuit by the first altitude value HV; and a third calculating circuit that outputs a value equal to the output of the second calculating circuit divided by the output of the third multiplexer.

10. The apparatus as recited in claim 9, wherein the second grade calculating circuit comprises:

a second modulus comparator that receives, as inputs, the output of the third calculating circuit and the second altitude value HT and that outputs a second comparator signal at the first value when the output of the third calculating circuit is greater than the second altitude value HT, otherwise outputting the second comparator signal at the second value; and a fourth multiplexer that receives the second comparator signal, the output of the third calculating circuit and the second altitude value HT and that outputs the output of the third calculating circuit when the second comparator signal is at the first value, otherwise outputting the second altitude value HT.

11. An apparatus for calculating a grade of membership α of an antecedent part of a fuzzy rule comprising:

a storing device that stores an input value I, a value CV defining a position of a vertex of a triangle that defines a membership function in a universe of discourse, a value LVD defining a first distance between the position CV of the vertex and a point of intersection between a left side of the triangle that defines the membership function and an axis of the universe of discourse, a value RVD defining a second distance between the position CV of the vertex and a point of intersection between a right side of the triangle that defines the membership function and the axis of the universe of discourse, a first altitude value HV of said triangle and a second altitude value HT of a trapezoid defined by said triangle;

a comparator connected to the storing device that compares I and CV and that outputs a first comparator signal at a first value when I>CV otherwise outputting the first comparator signal at a second value;

a first grade calculating circuit connected to the comparator and the storing device that calculates and stores a value A1=(HV*(I−CV))/RVD when the first comparator signal is the first value otherwise outputting A1=(HV*(CV−I))/LVD;

a second grade calculating circuit connected to the first grade calculating circuit and the storing device that calculates a value a=HV−A1 when A1<HV otherwise setting a=0; and a third grade calculating circuit connected to the second grade calculating circuit and the storing device that calculates α=HT when a>HT otherwise outputting α=a, wherein the first grade calculating circuit comprises:
  a first multiplexer that receives the first comparator signal, the value CV and the input value I and that outputs the value CV when the first comparator signal is at the first value, otherwise outputting the input value I;
  a second multiplexer that receives the first comparator signal, the input value I and the value CV and that outputs the input value I when the first comparator signal is at the first value, otherwise outputting the value CV;
  a third multiplexer that receives the first comparator signal, the value LVD and the value RVD and that outputs the value LVD when the first comparator signal is at the first value, otherwise outputting the value RVD;
  a first calculating circuit that outputs a value equal to the output of the first multiplexer minus the output of the second multiplexer;
  a second calculating circuit that multiplies the output of the first calculating circuit by the first altitude value HV; and
  a third calculating circuit that outputs a value equal to the output of the second calculating circuit divided by the output of the third multiplexer.

12. The apparatus as recited in claim 11, wherein the second grade calculating circuit comprises:
  a second modulus comparator that receives, as inputs, the output of the third calculating circuit and the first altitude value HV and that outputs a second comparator signal at the first value when the output of the third calculating circuit is greater than the first altitude value HV, otherwise outputting the second comparator signal at the second value;
  a fourth calculating circuit that outputs a value equal to the first altitude value HV minus the output of the third calculating circuit; and
  a fourth multiplexer that receives, as inputs, the second comparator signal, the output from the fourth calculating circuit and a value equal to zero and that outputs the signal from the fourth calculating circuit when the second comparator signal is at the first value, otherwise outputting the value zero.

13. The apparatus as recited in claim 12, wherein the third grade calculating circuit comprises:
  a third modulus comparator that receives, as inputs, the second altitude value HT and the output from the fourth multiplexer and that outputs a third comparator signal at the first value when the output of the fourth multiplexer is greater than the second altitude value HT, otherwise outputting the third comparator signal at the second value; and
  a fifth multiplexer that receives, as inputs, the third comparator signal, the output of the fourth multiplexer and the second altitude value HT and that outputs the output of the fourth multiplexer when the third comparator signal is at the first value, otherwise outputting the second altitude value HT.

14. An apparatus for calculating a grade of membership α of an antecedent part of a fuzzy rule comprising:
  a storing device that stores an input value I, a value CV defining a position of a vertex of a triangle that defines a membership function in a universe of discourse, a constant KL equal to multiplying a maximum degree of truth by $2^n$ and dividing by a first distance between said position of the vertex in the universe of discourse and a point of intersection between a left side of the triangle that defines the membership function and an axis of the universe of discourse, a constant KR equal to multiplying the maximum degree of truth by $2^n$ and dividing by a second distance between said position of the vertex in the universe of discourse and a point of intersection between a right side of the triangle that defines the membership function and the axis of the universe of discourse, a first altitude value HV of said triangle and a second altitude value HT of a trapezoid defined by said triangle, a value of n being a number of bits with which the first and second distances are defined;

a comparator connected to the storing device that compares I and CV and that outputs a first comparator signal at a first value when I>CV otherwise outputting the first comparator signal at a second value;

a first grade calculating circuit connected to the comparator and the storing device that calculates and outputs a value C=(KR*(I−CV)) when the first comparator signal is the first value otherwise outputting C=(KL*(CV−I));

a dividing circuit connected to the first grade calculating circuit that calculates and outputs A1=$C/2^n$;

a second grade calculating circuit connected to the dividing circuit and the storing device that calculates a value a=HV−A1 when A1≦HV otherwise setting a=0; and a third grade calculating circuit connected to the second grade calculating circuit and the storing device that calculates and outputs α=HT when a>HT otherwise outputting α=a, wherein the first grade calculating circuit comprises:
    a first multiplexer that receives the first comparator signal, the value CV and the input value I and that outputs the value CV when the first comparator signal is at the first value, otherwise outputting the input value I;
    a second multiplexer that receives the first comparator signal, the input value I and the value CV and that outputs the input value I when the first comparator signal is at the first value, otherwise outputting the value CV;

a third multiplexer that receives the first comparator signal, the constant KL and the constant KR and that outputs the constant KL when the first comparator signal is at the first value, otherwise outputting the constant KR;

a first calculating circuit that outputs a value equal to the output of the first multiplexer minus the output of the second multiplexer; and a second calculating circuit that outputs a value equal to the output of the first calculating circuit multiplied by the output of the third multiplexer.

15. The apparatus as recited in claim 14, wherein the dividing circuit comprises:

a third calculating circuit that receives the output of the first calculating circuit having m+n bits and that outputs a value equal to the m most significant bits plus a most significant bit of the n least significant bits.

16. The apparatus as recited in claim 15, wherein the second grade calculating circuit comprises:

a second modulus comparator that receives the output of the third calculating circuit and the first altitude value HV and that outputs a second comparator signal at the first value when the output of the third calculating circuit is greater than the first altitude value HV, otherwise outputting the second comparator signal at the second value;

a fourth calculating circuit that outputs a value equal to the first altitude value HV minus the output of the third calculating circuit; and a fourth multiplexer that receives the second comparator signal, the output of the fourth calculating circuit and a signal equal to zero and that outputs the value of the fourth calculating circuit when the second comparator signal is at the first value, otherwise outputting the value zero.

17. The apparatus as recited in claim 16, wherein the third grade calculating circuit comprises:

a third modulus comparator that receives, as inputs, the output of the fourth multiplexer and the second altitude value HT and that outputs a third comparator signal at the first value when the output of the fourth multiplexer is greater than the second altitude value HT, otherwise outputting the third comparator signal at the second value; and a fifth multiplexer that receives the third comparator signal, the output of the fourth multiplexer and the second altitude value HT and that outputs the output of the fourth multiplexer when the third comparator signal is at the first value, otherwise outputting the second altitude value HT.

18. An apparatus for calculating a grade of membership $\alpha$ of an antecedent part of a fuzzy rule comprising:

a storing device that stores an input value I, a value CV defining a position of a vertex of a triangle that defines a membership function in a universe of discourse, a constant KL equal to multiplying a maximum degree of truth r by $2^n$ and dividing by a first distance between said position of the vertex in the universe of discourse and a point of intersection between a left side of the triangle that defines the membership function and an axis of the universe of discourse, a constant KR equal to multiplying the maximum degree of truth r by $2^n$ and dividing by a second distance between said position of the vertex in the universe of discourse and a point of intersection between a right side of the triangle that defines the membership function and the axis of the universe of discourse a first altitude value HV of said triangle and a second altitude value HT of a trapezoid defined by said triangle, a value of n being a number of bits with which the first and second distances are defined;

a comparator connected to the storing device that compares I and CV and that outputs a first comparator signal at a first value when I>CV otherwise outputting the first comparator signal at a second value;

a first grade calculating circuit connected to the comparator and the storing device that calculates and outputs a value C=(KR*(I−CV)) when the first comparator signal is the first value otherwise outputting C=(KL*(CV−I));

a dividing circuit connected to the first grade calculating circuit that calculates and outputs A1=C/$2^n$;

a second grade calculating circuit connected to the dividing circuit and the storing device that calculates a value $\overline{\alpha}$=A1 when A1<r, otherwise setting $\overline{\alpha}$=r and outputting $\alpha$=r−$\overline{\alpha}$, wherein the first grade calculating circuit comprises:

a first multiplexer that receives the first comparator signal, the value CV and the input value I and that outputs the value CV when the first comparator signal is at the first value, otherwise outputting the value I;

a second multiplexer that receives the first comparator signal, the value I and the value CV and that outputs the value I when the first comparator signal is at the first value, otherwise outputting the value CV;

a third multiplexer that receives the first comparator signal, the constant KL and the constant KR and that outputs the constant KL when the first comparator signal is at the first value, otherwise outputting the second constant KR;

a first calculating circuit that outputs a value equal to the output of the first multiplexer minus the output of the second multiplexer; and a second calculating circuit that outputs a value equal to the output of the first calculating circuit multiplied by the output of the third multiplexer to produce a signal having m most significant bits and n least significant bits.

19. The apparatus as recited in claim 18, wherein the dividing circuit comprises:

a third calculating circuit that adds the m most significant bits to a most significant bit of the n least significant bits of the output of the second calculating circuit.

20. The apparatus as recited in claim 19, wherein the second grade calculating circuit comprises:

a second modulus comparator that receives, as inputs, the maximum degree of truth r and the output of the dividing circuit and that outputs a second comparator signal at the first value when the output of the dividing circuit is greater than the maximum degree of truth r, otherwise outputting the second comparator signal at the second value; and a fourth multiplexer that receives the second comparator signal, the output of the dividing circuit and the maximum degree of truth r and that outputs the output of the dividing circuit when the second comparator signal is at the first value, otherwise outputting the maximum degree of truth r.

* * * * *